US011898304B2

(12) United States Patent
Rapaport et al.

(10) Patent No.: US 11,898,304 B2
(45) Date of Patent: Feb. 13, 2024

(54) ANTIMONY FREE BROMINATED FLAME RETARDANT SYSTEM FOR TEXTILES

(71) Applicant: BROMINE COMPOUNDS LTD., Beer Sheva (IL)

(72) Inventors: Ella Rapaport, Lachish Darom (IL); Itzhak Shalev, Beit Gamliel (IL)

(73) Assignee: BROMINE COMPOUNDS LTD., Beer Sheva (IL)

( * ) Notice: Subject to any disclaimer, the term of this patent is extended or adjusted under 35 U.S.C. 154(b) by 551 days.

(21) Appl. No.: 15/580,043

(22) PCT Filed: Jun. 9, 2016

(86) PCT No.: PCT/IL2016/050605
§ 371 (c)(1),
(2) Date: Dec. 6, 2017

(87) PCT Pub. No.: WO2016/199145
PCT Pub. Date: Dec. 15, 2016

(65) Prior Publication Data
US 2018/0135239 A1 May 17, 2018

Related U.S. Application Data

(60) Provisional application No. 62/172,814, filed on Jun. 9, 2015.

(51) Int. Cl.
| | |
|---|---|
| *D06M 11/71* | (2006.01) |
| *C09K 21/12* | (2006.01) |
| *D06M 11/72* | (2006.01) |
| *D06M 13/298* | (2006.01) |
| *D06M 13/44* | (2006.01) |
| *D06M 15/263* | (2006.01) |
| *D06M 13/313* | (2006.01) |
| *D06M 15/667* | (2006.01) |
| *C09K 21/14* | (2006.01) |
| *D06M 13/292* | (2006.01) |
| *D06M 13/453* | (2006.01) |
| *D06M 15/37* | (2006.01) |
| *D06M 15/55* | (2006.01) |

(52) U.S. Cl.
CPC ............ *D06M 11/71* (2013.01); *C09K 21/12* (2013.01); *C09K 21/14* (2013.01); *D06M 11/72* (2013.01); *D06M 13/292* (2013.01); *D06M 13/298* (2013.01); *D06M 13/313* (2013.01); *D06M 13/44* (2013.01); *D06M 13/453* (2013.01); *D06M 15/263* (2013.01); *D06M 15/37* (2013.01); *D06M 15/55* (2013.01); *D06M 15/667* (2013.01); *D06M 2200/30* (2013.01)

(58) Field of Classification Search
None
See application file for complete search history.

(56) References Cited

U.S. PATENT DOCUMENTS

| | | | |
|---|---|---|---|
| 3,955,032 A | 5/1976 | Mischutin | |
| 3,963,437 A | 6/1976 | Leblanc et al. | |
| 4,076,630 A | 2/1978 | Smith | |
| 4,092,251 A | 5/1978 | Smith | |
| 4,600,606 A | 7/1986 | Mischutin | |
| 7,504,449 B2 | 3/2009 | Mazor et al. | |
| 8,524,125 B2 * | 9/2013 | Mazor | C09K 21/08 252/601 |
| 2003/0190464 A1 | 10/2003 | Narum et al. | |
| 2003/0211291 A1 | 11/2003 | Castiglione et al. | |
| 2013/0260626 A1 * | 10/2013 | Stowell | D06M 13/244 442/141 |
| 2013/0341575 A1 * | 12/2013 | Kasowski | C09K 21/12 252/601 |

FOREIGN PATENT DOCUMENTS

| | | |
|---|---|---|
| CN | 1646653 | 7/2005 |
| CN | 1652923 | 8/2005 |
| CN | 1711313 | 12/2005 |
| CN | 101466533 | 6/2009 |
| CN | 101631910 | 1/2010 |
| CN | 101978110 | 2/2011 |
| CN | 102775747 | 11/2012 |
| CN | 102775756 | 11/2012 |
| CN | 103989275 | 8/2014 |
| CN | 101831308 | 9/2020 |
| EP | 0 155 834 | 9/1985 |
| JP | 52-128499 | 10/1977 |

(Continued)

OTHER PUBLICATIONS

Office Action issued in CN Appln. No. 201680046692.0 dated Aug. 29, 2019 (w/ partial translation).
Touval, "Antimony and Other Inorganic Compounds—Antimony Compounds" *Kirk Othmer's Encyclopedia of Chemical Technology*, vol. 10, pp. 355-372 (1993).
*Decabromodiphenylether: An Investigation of Non-Halogen Substitutes in Electronic Enclosure and Textile Applications*, Pure Strategies, Inc., The Lowell Center for Sustainable Production, 69 pages (Apr. 2005).
Weil et al., "Non-Durable Treatments" *Flame Retardants for Plastics and Textiles*, 11—Flame Retardants in Commercial Use or Development for Textiles, pp. 199-201 (2009).

(Continued)

*Primary Examiner* — Lynda Salvatore
(74) *Attorney, Agent, or Firm* — Nixon & Vanderhye PC

(57) ABSTRACT

The present invention teaches an antimony free brominated flame retardant composition, comprising a brominated flame retardant, an organic phosphorus-containing flame retardant which is an organic phosphate that is either an amorphous solid or a liquid, and a flame retardant which is a source of nitrogen and inorganic phosphorus, this source being amorphous compound. The invention further teaches textile coating formulations comprising these compositions, a process for applying them on textile fabrics, and the flame retarded fabrics coated by these compositions and formulations.

13 Claims, No Drawings

(56) References Cited

FOREIGN PATENT DOCUMENTS

| | | |
|---|---|---|
| JP | 2005-525256 | 8/2005 |
| JP | 2009-533559 | 9/2009 |
| TW | 201134925 | 10/2011 |
| WO | WO 03/097344 | 11/2003 |
| WO | WO 2007/096883 | 8/2007 |
| WO | WO 2008/027536 | 3/2008 |
| WO | WO 2009/093234 | 7/2009 |
| WO | WO 2012/061373 | 5/2012 |

OTHER PUBLICATIONS

International Search Report for PCT/IL2016/050605 dated Sep. 19, 2016, 4 pages.
Written Opinion of the ISA for PCT/IL2016/050605 dated Sep. 19, 2016, 6 pages.
Office Action issued in JP Appln. No. 2017-563609 dated Jan. 7, 2020 (w/ translation).
Office Action issued in CN Appln. No. 201680046692.0 dated Mar. 30, 2020 (w/ partial translation).
Ren et al., Fire retardant synergism of hydroquinone bis(diphenyl phosphate) and novolac phenol in acrylonitrile-butadiene-styrene copolymer. Fire Mater., 2015; 39: 557-569.

* cited by examiner

ANTIMONY FREE BROMINATED FLAME RETARDANT SYSTEM FOR TEXTILES

This application is the U.S. national phase of International Application No. PCT/IL2016/050605 filed Jun. 9, 2016 which designated the U.S. and claims the benefit of U.S. Provisional Application No. 62/172,814 filed Jun. 9, 2015, the entire contents of each of which are hereby incorporated by reference.

The present invention relates to the field of flame-retardants and, more particularly, to novel antimony free flame retardant systems for textiles, their preparation and the antimony-free flame-retarded textile fabrics, which are flame retarded with this system.

Textiles are an essential part of everyday life and are found, for example, in draperies, cloths, furniture and vehicle upholsteries, toys, packaging material and many more applications.

Flame retardants used for the protection of textiles must be environmentally and physiologically safe, compatible with the fabric, non-damaging to the aesthetical and textural properties of the fabric (for example, to remain transparent) and must be resistant to extensive washing and cleaning (generally termed as "durable"). Above all, a flame retardant agent suitable for textile treatment should pass the standard flammability tests in the field, preferably even after 5 washing cycles or more.

Natural and synthetic fibers and polymers are often blended or layered to obtain products with a variety of desirable aesthetic and functional properties such as absorption, tensile strength, durability, softness, crease resistance, abrasion resistance, color fastness and comfort.

Flame retardation of textiles using aromatic bromine-containing formulations (BFRs) adhered to the substrates by means of binders, has been long established (for instance, U.S. Pat. No. 3,955,032 and U.S. Pat. No. 4,600,606).

The main drawbacks of existing formulations include high bromine content demand, high dry add-on demand, streak marks on dark fabrics, excessive dripping during combustion of thermoplastic fibers and dispersion instability.

Over the years, several antimony-based compounds have been used as flame-retardant synergists, including $Sb_2O_3$, $Sb_2O_5$ and $Na_3SbO_4$ (Touval, I., (1993) "Antimony and other inorganic Flame Retardants" in Kirk Othmer's Encyclopedia of Chemical Technology, Vol. 10, p. 355-372, $3^{rd}$ Edition, John Wiley and Sons, N.Y.). The addition of antimony oxide (ATO) to halogenated flame retardants increases their efficiency and reduces the amount of additives and/or halogenated FR agent to be used. However, the addition of such synergist is costly and further contributes to the high add-on of the formulation.

ATO is especially important when using brominated FRs on cotton containing textile blends with synthetic fibers such as polyester/cotton and nylon/cotton blends. In both cases, the synergistic action of ATO allows using a lesser amount of the BFR (see for example, EP155834, and U.S. Pat. No. 3,963,437)

Lately, the safety of ATO has been called into serious question and its use is in the process of being limited in some applications. There are therefore many attempts to find efficient ATO replacements worldwide, but with no commercial success. Furthermore, none of these replacements are applied in textiles or adhesives due to durability, performance, required add-on and cost limitations.

ATO-free systems in textiles with reasonable add-on (below 50% on weight of base fabric) have been available only when using some phosphorus-based flame retardants (PFRs). PFRs cover a wide range of inorganic and organic compounds and have a broad range of applications. The most important phosphorus-containing flame retardants are phosphate esters, phosphonates and phosphinates. Polyester textiles are mainly flame retarded using a phosphonate in a 'thermosol' process. Phosphinates are mainly applied in thermoplastic engineering resins where heat release rate and high temperature activation are unique issues of concern.

However, PFRs are less efficient compared to brominated FRs, cannot be used in backcoating of fabrics and do not provide a flame retardant solution on difficult substrates which have a high propensity to ignite. The main reason for this is that PFRs mainly act in the solid phase promoting char and therefore retard flame locally and do not affect the entire material as do gas phase active BFRs.

Resorcinol-bis(diphenylphosphate) (RDP) is an oligomeric phosphate ester flame retardant sometimes used as a non-durable FR in technical textiles (see for example in: *Decabromodiphenylether: An Investigation of Non-Halogen Substitutes in Electronic Enclosure and Textile Applications*, Pure Strategies, Inc. The Lowell Center for Sustainable Production, University of Massachusetts Lowell, April 2005).

One the main drawbacks of RDP is its oily character which gives fabrics an unpleasant hand if using solely RDP. In addition, it is very difficult to apply it in significant amounts to fabrics in a continuous process: RDP alone does not coat cotton well and it is impossible to obtain sufficient add-on. RDP by itself is also hydrolytically unstable which causes it to have poor laundry fastness.

FRs based on compounds containing inorganic Phosphorus and organic or inorganic Nitrogen, are in themselves not sufficiently active to achieve useful flame retardancy which is durable to the end use conditions of the treated article (E.D. Weil, S. V. Levchick, Flame Retardants for Plastics and Textiles, Hanser, Cincinnati, OH, pp. 199-201 (2009)). For example, U.S. Pat. No. 7,504,449 teaches a brominated FR textile formulation, with ATO, to which an ammonium polyphosphate smoldering suppressant agent can be added.

U.S. Pat. No. 8,524,125 teaches the preparation of smoldering suppressing compositions comprising a water-insoluble complex which consists of a multivalent metal and an ammonium salt of superphosphoric acid. One such composition is TexFRon™ AG, an aluminum ammonium polyphosphate salt, which is also known as AlASP (aluminum ammonium super phosphate). TexFRon™ AG was used as anti-smoldering agents in textiles (see for example in WO 08/027536, WO 12/061373 or WO 2007/096883). Ammonium polyphosphate (APP) and melamine polyphosphate (MPP) are other inorganic poly phosphates containing a nitrogen counter ion, but both have a low hydrolytic stability, making them unsuitable for applications where durability to laundry and humid conditions are required.

Many attempts have been made over the years to develop antimony-free brominated FR compositions suitable for use in textile applications, but without success, and while in some cases the amount of ATO could be lowered it was never completely circumvented.

More specifically, no antimony-free brominated FR compositions were ever prepared for textile applications, in particular not for textile applications requiring washing durability.

The present invention surprisingly discloses the successful preparation of stable and durable antimony-free brominated FR compositions, their use as flame-retardants in textile applications, and fabrics obtained as a result of this application.

In particular, the inventors have now developed a series of antimony-free flame retardant formulations comprising:
a brominated FR,
an amorphous organic phosphate flame retardant, and
a flame retardant which is a source of nitrogen and inorganic phosphorus, this source being an amorphous compound.

These formulations were found to be suitable for textile applications, on a variety of fabrics, and some of them maintained their high efficiency after many washing cycles.

In contrast, and as exemplified in comparative Example 12, when the inventors prepared the corresponding antimony-free binary flame retardant systems, and applied them on fabrics, such as 100% cotton, and cotton-polyester fabrics, they all failed the flame retardancy tests, even before laundry (see Table 32).

In particular none of the following binary antimony-free flame retardant systems were successful in textile padding application:
A brominated FR and an organic phosphate (formulations 1a and 1d, when the organic phosphate was part of the brominated FR, or when the organic phosphate was external, respectively); or
An organic phosphate FR along with an amorphous compound which is a source of inorganic phosphate and nitrogen (formulation 1b); or
A brominated FR with an amorphous compound which is a source of inorganic phosphate and nitrogen (formulation 1c), In one example, while FR tris(tribromoneopentyl) phosphate (FR-370, TexFRon 3000) having both an organic P and Br on the same molecule was attempted without ATO and without an amorphous compound which is a source of nitrogen and inorganic phosphorus (see comparative example 12) on 100% PET and 50/50 cotton/PET fabrics, it failed. However, when using the same antimony-free system, along with just 10% by weight of TexFRon AG (formulation 18 in table 5) good flame retardancy was obtained (see Examples 8J and 11A).

These results complement the general knowledge in the field of flame retardancy, that antimony oxide is essential to achieve flame retardancy of textiles when brominated FRs are involved.

One important advantage of the newly developed antimony-free ternary system is that it has been shown to be useful for finishing textiles and fabrics even at relatively low bromine content and low binder concentration. In fact, a bromine content as low as 4% by weight of the fabric, was sufficient to pass the ASTM 6413, NFPA 701 flammability test, while brominated FRs alone without ATO normally require above 20% Br, a high loading which is untenable for practical textile finishing.

Therefore, according to one aspect of the invention, there is now provided a flame retardant composition, comprising:
a) A brominated flame retardant,
b) An organic phosphorus-containing flame retardant, this organic phosphorus-containing flame retardant being an organic phosphate that is in a disordered structure,
c) An flame retardant consisting of an amorphous source of nitrogen and inorganic phosphorus.

As used herein, the term "flame retardant", which is also termed herein, interchangeably, as "fire retardant", "flame resistant" and "fire resistant", describes a compound, a composition or a formulation which is capable of reducing or eliminating the tendency of a substance to ignite when exposed to a low-energy flame.

As taught in numerous examples detailed hereinbelow, the inventors have now shown that stable and efficient flame retardant compositions can be prepared using a ternary combination of brominated FRs, amorphous organic phosphates and flame retardants amorphous compound, which is a source nitrogen and inorganic phosphorus, such that the use of antimony oxide can be completely avoided.

As explained in the background section hereinabove, many attempts have been made to prepare antimony-free brominated FR compositions, and the inventors have now devised for the first time such a composition, that is completely antimony free yet suitable for application on textiles, at relatively low add-ons and binder content, therefore maintaining the textural and aesthetical properties of the fabric. Surprisingly, some of these brominated FR ternary compositions were also found to be suitable for textile applications requiring high washing durability, again at relatively low add-on and being completely antimony-free.

Thus, according to preferred embodiments of the invention, this composition is a substantially antimony-free composition, or an antimony-free composition.

The term "substantially antimony-free" refers to compositions containing antimony in an amount such that the molar ratio of Sb:Br is lower than 1:12, more preferably lower than 1:15, more preferably lower than 1:20, more preferably lower than 1:50, e.g. containing not more than 5% of antimony trioxide by weight of the treated textile fabric.

The term "antimony-free" as used herein refers to a composition to which no antimony has been specifically added (either as elemental antimony or as an antimony-containing alloy, compound, or other like substance), such that the antimony is present in the FR composition only as a trace component or as an impurity of 0.1% by weight or less.

The $1^{st}$ component of the flame retardant composition of the present invention is a brominated flame retardant.

The term "brominated flame retardant", as used herein, means any organic chemical containing the element bromine that may be added to a flammable substrate to inhibit flame formation.

As is used herein, the term "flammable substrate" describes an article that easily ignites when exposed to a low-energy flame and has a surface that can be beneficially coated (either wholly or partially) with a flame retardant formulation. Exemplary flammable substrate or articles include, without limitation, textiles, furniture, toys, and more.

Preferred flammable substrates onto which the flame retardant formulations described herein can be beneficially applied are textile fabrics.

Preferably, in cases where the formulation is intended to be applied on a textile fabric, the flame retardants are selected suitable for use on textiles, and the brominated FR is a brominated FR that passes the standard textile flammability tests, and is further chosen to be:
environmentally and physiologically safe
compatible with the fabric
non-damaging to the aesthetical and textural properties of the fabric, and
washing and cleaning durable.

Representative examples of brominated flame retardants that are suitable for use in the context of the present invention, include, without limitation:

Br-containing aliphatic or alicyclic hydrocarbons such as hexabromocyclododecane, tris(tribromoneopentyl) phosphate;

Br-containing aromatic compounds such as decabromodiphenyl ethane, hexabromobenzene, 1,2-bis(2,3,4,5,6-pentabromophenyl)ethane, ethylene bis(pentabromodiphenyl), pentabromobenzyl acrylate, Ethylenebistetrabromophthalimide, decabromodiphenyloxide tetradecabromodiphenoxy benzene, octabromodiphenyl ether, 2,3-dibromopropyl pentabromophenyl ether and the like;

brominated bisphenols and their derivatives such as tetrabromobisphenol A, tetrabromobisphenol A bis(2,3-dibromopropyl ether), tetrabromobisphenol A (2-bromoethyl ether), tetrabromobisphenol A diglycidyl ether, an adduct of tetrabromobisphenol A diglycidyl ether and tribromophenol;

oligomers of brominated bisphenol derivatives such as tetrabromobisphenol A polycarbonate oligomer, and an epoxy oligomer of an adduct of tetrabromobisphenol A glycidyl ether and bromobisphenol;

bromoaromatic compounds such as ethylene bistetrabromophthalimide, and bis(2,4,6-tribromophenoxy)ethane;

brominated acrylic resins; ethylene bisdibromonorbornane dicarboxyimide, brominated polymers, such as brominated polystyrenes (for example FR-803 by ICL), brominated carbonate oligomers (BCOs), brominated epoxy oligomers (BEOs), brominated poly acrylates (such as poly pentabromobenzyl acrylate, FR 1025 by ICL), brominated polybutadiene (such as FR122P by ICL) etc. Additional examples of this group are the proprietary Emerald Innovation™ 1000 and TexFRon P, both proprietary brominated polymers, exemplified in the Examples section below.

As can be seen in Table 5 and in the ensuing textile flammability tests, a wide range of brominated FRs were tested as part of the FR composition of the present invention, and have all successfully passed the flammability tests, thus demonstrating the applicability of the composition of the present invention with any group of brominated FR.

Furthermore, it has been shown and exemplified further below that the brominated FR according to the present invention can be composed of a mixture of several suitable brominated FRs. For example, TexFRon 4002 is in fact a combination of 2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol.

As shown in Table 5 and ensuing examples, the brominated FR was successfully used at a concentration which ranges from about 35% to about 90% by weight of the FR composition. More preferably, this concentration ranges from about 60% to about 80% by weight of the FR composition.

As noted above, the $2^{nd}$ necessary component in the flame retardant composition of the present invention is an organic phosphorus-containing flame retardant.

While the term "organic phosphorus-containing flame retardant" is known to encompass many chemical groups, it is used in the context of the present invention to refer only to the group of organic phosphates.

The term "organic phosphate" as used herein, refers to any compound or mixture of compounds containing the general molecular structure of phosphoric or polyphosphoric acid namely, $[(HO)_3PO]_n$, in which at least one hydrogen atom is replaced by an organic residue; and n is a number from 1 to about 10. Thus, the organic phosphate of the present invention can either originate as a monophosphoric acid or a polyphosphoric acid in which the phosphoric acid residues are covalently linked.

As used herein, the term "organic group" used interchangeably with the term "organic residue" means a hydrocarbon group (with optional elements other than carbon and hydrogen, such as oxygen, nitrogen, sulfur, silicon, and halogens) that is classified as an aliphatic group, cyclic group, or combination of aliphatic and cyclic groups (e.g., alkaryl and aralkyl groups).

The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, hexyl, heptyl, dodecyl, octadecyl, amyl, 2-ethylhexyl, and the like. The term 'alkenyl group' means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group, including within its scope alkaryl and aralkyl groups. The term "heterocyclic group" means a closed ring hydrocarbon in which one or more of the atoms in the ring is an element other than carbon (e.g., nitrogen, oxygen, sulfur, etc.).

Preferred organic residues of the organic phosphates suitable for the present invention are those having the carbon content of 1 to about 110 carbon atoms per molecule.

Organic residues are linked to the phosphorus atom via an ester bond. Therefore the term "organic phosphates" may sometimes be used interchangeably with the term "organic phosphorus esters".

Examples of appropriate organic residues include but are not limited to methyl, ethyl, butyl, hexyl, neopentyl, phenyl.

Some examples of organophosphates suitable for the present invention include, but are not limited to, triphenyl phosphate (TPP), resorcinol bis(diphenylphosphate) (RDP or RDP-HP), bisphenol A diphenyl phosphate (BADP), tricresyl phosphate (TCP); tris (2-chloroisopropyl) phosphate, 2-ethylhexyl diphenyl phosphate, butylated triphenyl phosphate ester (such as t-butylphenyl diphenyl phosphate, bis(t-butylphenyl) phenyl phosphate tri (t-butylphenyl) phosphate)), tris-isobutylated triphenyl phosphate (TBPP), tris (1-chloro-2-propyl) phosphate (TCPP) and tris (1,3-dichloro-2-propyl) phosphate (TDCPP).

Preferably, the organic phosphate flame retardant is selected from the group comprising of an Resorcinol-bis(diphenylphosphate) (RDP) Tris (2-chloroisopropyl) phosphate (Fyrol PCF), 2-Ethylhexyl Diphenyl Phosphate, Butylated triphenyl phosphate ester.

More preferably, the organic phosphate flame retardant is Resorcinol-bis(diphenylphosphate) (RDP).

It has been found by the inventors that for use in textiles, the organic phosphate must have a disordered structure, for example be a liquid or be a non-crystalline (amorphous) solid. If the organic phosphate is not amorphous, it may crystalize at room temperature, thus damaging the properties of the fabric and adversely affecting the flame retardancy of the treated fabric.

For example, hydroquinone bis diphenyl phosphate (Sol-DP™), which is an organic phosphate salt used as anti-smoldering agent, tends to migrate out of textiles post treatment (termed "blooming"). This is related to its propensity, not shared by the more amorphous RDP, to recrystallize from the melt into discrete crystals at room temperature, and therefore Sol-DP™ is not suitable for use in the present invention.

Therefore, according to one preferred embodiment of the present invention, the organic phosphate is an organic phosphate having a disordered structure.

The term "disordered structure" refers to both a liquid structure and to an "amorphous solid" structure and encompasses any non-crystalline structure of a compound.

As used herein and often in the literature, the terms amorphous, non-crystalline, glassy and vitreous are used interchangeably with regard to solids, and include any solid material that is X-ray amorphous.

In practice, to determine if a certain FR is amorphous or not, an aqueous dispersion of the FR is prepared and a thin layer is applied on a substrate, melted and then allowed to cool. The obtained film is visually inspected for the texture. If it is unbroken and not granular, it is considered to be amorphous. In other words, the amorphous FR, such as the amorphous organic phosphate or the amorphous compound being the source of inorganic phosphate and nitrogen, is expected not to recrystallize after being melted.

Given the requirement that the organic phosphate would be in a disordered structure, such as a liquid or an amorphous solid, it is clear that the organic residue in most cases cannot be a carbohydrate, a protein, a peptide or a lipid.

The organic phosphate is used at a concentration which ranges from about 15% to about 50% by weight of the FR composition. More preferably, the organic phosphate is used at a concentration which ranges from about 30% to about 40% by weight of the FR composition.

It has been found that the organic phosphate and the brominated FR can be present in the same molecule, namely a brominated phosphate ester. For example, the brominated FR tris(tribromoneopentyl) phosphate (FR-370) is in fact also an organic phosphate, and has been found to be suitable for the present invention (see formulation 18 in Table 5 and respective flammability results in Examples 8J and 11A, before and after laundry).

In this case, the weight concentration of the organic phosphate is not measured separately, but is considered as part of the brominated FR concentration. For example, in Table 5, formulation 18, it says that the brominated FR concentration (tris(tribromoneopentyl) phosphate, FR-370, TexFRon 3000) was 90% by weight.

Thus, according to another aspect of the invention, there is provided a flame retardant composition, comprising:
I. A brominated phosphate ester,
II. A flame retardant which is a source of nitrogen and inorganic phosphorus, this source being an amorphous compound.

It should be noted that the after glow of formulation 18 on a woven 50%-50% cotton polyester fabric and on a nylon fabric (examples 8J and 11B, respectively), was higher compared to formulations comprising an external source of amorphous organic phosphate. This is probably due to the relatively low concentration of organic phosphate, that derives only from the internal phosphorus atoms (about 3% of the TexFRon 3000 (FR-370) weight), rendering it to be less efficient compared to the other formulations.

As shown in the Examples section, the $3^{rd}$ component that needs to be present in the flame retardant compositions of the present invention is a flame retardant which is a source of nitrogen and inorganic phosphorus, this source being an amorphous compound.

The term "inorganic phosphorus" refers to the inorganic phosphorus within the amorphous compound of the third FR component, and is understood to mean the phosphorus present in the entities $H_3PO_4$, $H_2PO_4^-$ and $HPO_4^{-2}$, whereas none of the hydrogens are replaced by an organic group.

The amorphous compound which is the source of nitrogen and inorganic phosphorus, may contain one or more nitrogen atoms.

The Nitrogen atoms can be part of a nitrogen containing counter ion or form part of any other Nitrogen-containing entity. Without being bound to any specific theory, it is thought that the presence of Nitrogen within this amorphous compound is necessary to achieve the required flame retardancy and durability (see also Weil and Levchick above).

Thus, the present invention requires what is termed herein "a source of nitrogen and inorganic phosphorus", namely a compound containing both an inorganic phosphorus, as defined hereinabove, and one or more nitrogen atoms, as also defined hereinabove.

Preferably, the amorphous compound which is the source of nitrogen and inorganic phosphorus is an inorganic phosphate salt. The term "inorganic phosphate salt" does not encompass any organic phosphates as defined hereinabove.

Therefore, according to one preferred embodiment of the present invention, there is provided the composition described herein, wherein the source of nitrogen and inorganic phosphorus is an amorphous inorganic phosphate salt.

The term "inorganic phosphate salt" refers to a salt composed of a metal or ammonium cations and phosphate ions ($H_2PO_4^-$, $HPO_4^{2-}$, $PO_4^{3-}$, and combinations thereof). The term "inorganic phosphate" is used to distinguish these forms from organically bound phosphate such as in RDP.

According to one preferred embodiment of the invention, the nitrogen source forms part of the counter ion of this inorganic phosphate salt. More preferably, this nitrogen counter ion is an ammonium group.

According to another preferred embodiment of the invention, the nitrogen source is a nitrogen compound, such as urea, melamine, and guanidine.

Salts of phosphoric acid with nitrogen-containing cations, e.g. ammonium phosphate, salts of di- or polyphosphoric acid or superphosphoric acid with nitrogen-containing cations, e.g. ammonium polyphosphate, nitrogen compounds, e.g. urea, melamine and guanidine derivatives, are all suitable for this purpose.

Some specific examples of sources of nitrogen and inorganic phosphorus, suitable for the present invention, include, but are not limited to, an ammonium phosphate salt, a melamine phosphate salt, melamine pyrophosphate salt, a melamine polyphosphate (MPP) salt, an ammonium polyphosphate (APP) salt and a complex of a multivalent metal and ammonium superphosphoric acid, or mixtures thereof.

As can be seen in Examples 7D and 7E, a 50%-50% knit cotton-polyester fabric treated by formulations wherein the source of nitrogen and inorganic phosphorus was ammonium polyphosphate (APP) and melamine polyphosphate (MPP) gave excellent flame retardancy properties before laundry: having an after-flame time of 0 seconds, an after-glow time of 2-3 seconds, and a char length of 9-11 cm, all at a very reasonable add-on which was ranged 31-55%.

It was further found that when the source of nitrogen and inorganic phosphorus was AlASP, these flame retardant properties were maintained even after extensive washing, thereby rendering the flame retardant composition of the present invention into a durable flame retardant composition.

As is known in the art, the use of metal complexes of ammonium polyphosphates (APP) as anti-smoldering agents in textile applications has been substantially limited by low fastness to laundry processes. When applied on textiles, the ammonium phosphate additive is washed off within one or few washing cycles. Once this material is washed off, the treated fabric would fail the flammability tests due to prolonged smoldering.

It has been suggested that the instability of ammonium polyphosphate (APP) during laundry is due to the high solubility of the ammonium polyphosphates in water under laundry conditions (basic pH and large amount of water in each cycle), which is further increased by the hydrolysis thereof.

Therefore, ammonium polyphosphate (APP) is only suitable for textile FR applications not requiring washing durability, such as for draperies, carpets, toys, wall fabrics, decorative fabrics, mattresses and upholsteries.

As shown in the examples further below, it has now been possible to form durable antimony-free flame retardant compositions by choosing source of inorganic phosphorus and nitrogen to be not only amorphous, but also be essentially non-soluble in water and non-hydrolyzable. Ammonium polyphosphate (APP) mentioned above is amorphous, but is water soluble and readily hydrolyzes and is therefore not suitable to be part of durable applications.

As is well acceptable in the art, a textile is considered "durable" if it withstands 5 washing cycles without having remarkable change of a property thereof. The substrates treated with the formulations of the present embodiments were characterized by a washing fastness of 6, even 30 washing cycles.

The term "essentially non-soluble in water" as used herein refers to a solubility of less than 0.0213 g/l at room temperature.

The term "non-hydrolyzable" refers to a compound having a covalent bond that does not readily react with water. In the context of the present invention the source of nitrogen and inorganic phosphorus is an inorganic phosphate salt that does not release phosphoric acid into the solution over time. In practice, the inorganic phosphate salt of the present invention can be classified as being non-hydrolyzable if it is kept in aqueous conditions and no pH change is detected for at least 90 days.

Of the commercial compounds tested for this purpose two were found to be especially suitable for durable applications: TexFRon AG and, to some extent, also melamine polyphosphate.

Melamine polyphosphate is amorphous and water insoluble, and undergoes hydrolysis only after several washings. Therefore, according to one preferred embodiment of the invention, the source of nitrogen and inorganic phosphorus is melamine polyphosphate (MPP). Melamine polyphosphate (MPP) performed well in the flammability test but was durable to only 5 laundry cycles as opposed to TexFRon AG which yielded durability to at least 30 laundry cycles.

Therefore, melamine polyphosphate (MPP) may be used for textile applications requiring non-durable and durable conditions, such as draperies, carpets, tents, sleeping bags, toys, wall fabrics, decorative fabrics, mattresses and upholsteries.

As noted hereinabove, TexFRon AG is a proprietary Aluminum Ammonium super polyphosphate (AlASP), belonging to a class of metal complexes of superphosphric acid, the preparation and application of which being described in U.S. Pat. No. 8,524,125.

Therefore, according to one preferred embodiment of the present invention, the inorganic phosphate salt is a complex of a multivalent metal and ammonium superphosphoric acid. As shown in U.S. Pat. No. 8,524,125, this complex contains $PO_4^{3-}$ in an amount of at least 60 weight percents.

The term "metal complex" as defined herein, refers to a complex formed between the superphosphoric acid and one or more metal ions. Without being bound to any particular theory, it is assumed that the metal ions in the complex interact with negatively charged groups and/or other functional groups in the polyphosphoric acid structure.

To this effect, preferably, the metal is a multivalent metal, namely, having a valency greater than 1. As used herein and is well known in the art, valency is defined as the number of electrons in a substance that can be used to interact, via overlap of electron orbitals, with other substances.

According to preferred embodiments of the present invention, the multivalent metal is preferably a divalent metal or a trivalent metal.

Exemplary divalent metals, include, but are not limited to, calcium, copper, iron, magnesium, manganese, zinc, and cobalt.

Preferably, the divalent metal is calcium.

Exemplary trivalent metals, include, but are not limited to, aluminum and iron.

Preferably, the trivalent metal is aluminum.

As used herein, the phrase "superphosphoric acid", which is abbreviated herein as SPA, encompasses any mixture of orthophosphoric acid and polyphosphoric acid containing at least 82% $P_2O_5$, based on the common definitions for the constituents in polyphosphoric acid compositions. Preferably, the superphosphoric acid contains at least 83% $P_2O_5$. These levels of $P_2O_5$ correspond to a superphosphoric acid containing up to 30% of orthophosphoric acid (for 82% $P_2O_5$), and to a superphosphoric acid containing up to 12% of orthophosphoric acid (for 83% $P_2O_5$).

The term "orthophosphoric acid", which is also known and referred to in the art and herein as monophosphoric acid, refers to $H_3PO_4$.

The term "polyphosphoric acid" refers to a compound having two or more atoms of phosphorus in a chain (also termed acyclic) or ring structure, in alternating sequence with oxygen. The empirical formula for the commonly used acyclic polyphosphoric acid is $H_{n+2}P_nO_{3n+1}$; when n=2, the species is commonly known as pyrophosphoric acid, while when n=3, the species is commonly termed tripolyphosphoric acid. For example, a polyphosphoric acid containing 79.7% of $P_2O_5$ would have the average formula $H_4P_2O_7$, but actually contains about 18% $H_3PO_4$, about 42% $H_4P_2O_7$, about 23% $H_5P_3O_4$, and about 17% higher polyphosphoric acids.

In contrast to ammonium polyphosphate (APP) and melamine polyphosphate (MPP), metal complexes of the ammonium superphosphates, such as aluminum ammonium superphosphate (AlASP), are also highly non-hydrolyzable, probably due to the lengthy chain size. For example, the inventors have noted that an aqueous slurry of AlASP (TexFRon AG) has stood on shelf for over 5 years without any apparent pH change.

Indeed, as demonstrated in Examples 6-11 it has now been found that TexFRon AG can successfully serve as the source of nitrogen and inorganic phosphorus needed to obtain the antimony-free brominated flame retardant composition of the present invention. It has further been shown that formulations comprising TexFRon AG could withstand a large number of washing cycles, it being a good example of an amorphous, non-water soluble and non-hydrolyzable inorganic phosphate.

It should be noted that although compositions comprising a brominated FR and AlASP have been prepared in the past (for example tetrabromobisphenol A bis(2,3-dibromopropyl ether (FR-720) and AlASP in WO 2009/093234), it has been impossible to prepare them without the use of antimony and they contained from 1:1 to about 1:6 of antimony and halogen).

Thus, according to one preferred embodiment of the present invention, there is now provided a durable composition comprising a source of nitrogen and inorganic phosphorus which is an amorphous compound, which is also non-water soluble at room temperature and non-hydrolyzable.

As can be seen in the examples section further below, the application of formulations comprising TexFRon AG as the source of nitrogen and inorganic phosphorus (for example formulations 2-14 in Table 5 and ensuing application thereof), resulted in excellent flame retardancy, at low add-ons, and maintained the flame retardancy even after as many as 30 washing cycles Both TexFRon AG and melamine polyphosphate (MPP) are known as anti-smoldering agents.

As used hereinafter the term "smoldering", also known in the art as "after flame burning" or "after glow" refers to a burning which continues after the open flame has been extinguished. The phrase "smoldering suppressant", which is also referred to herein interchangeably as "smoldering suppressing agent" or "SS", or "anti smoldering agents" therefore describes a compound or a composition which reduces or eliminates the tendency of a substance to burn after no longer being exposed to a flame.

Some of the presently known flame retardants may also exert smoldering suppression and are therefore further referred to as smoldering suppressants.

The amorphous compound which is the source of nitrogen and inorganic phosphorus ranges from 10% to 30% by weight of the composition. However, as demonstrated in the Examples, an amount of 10% by weight was sufficient to achieve the required flame retardancy. Additional amounts of this component do not appear to enhance the properties of the FR composition, and are therefore possible, but not necessary.

When preparing suitable FR compositions according to the present invention, the relative amounts of the various components can be set in any number of combinations, such that the brominated FR is at a concentration which ranges from about 35% to about 90% by weight of the total FR weight, the organic phosphate is at a concentration which ranges from about 15% to about 50% by weight of the total FR weight, and the amorphous compound which is the source of nitrogen and inorganic phosphorus ranges from 10% to 30% by weight of the total FR weight.

According to one preferred embodiment, component 3, namely the source of nitrogen and inorganic phosphorus, is set at about 10% weight of the total FR weight, thus setting the overall % weight of the other FR components (component 1: the brominated FR and component 2: the organic phosphate that is in a disordered structure) to be 90% of the total FR weight. For example, formulations #3,4,9-14 and 16-17 teach compositions wherein 10% of the total FR weight is the source of nitrogen and inorganic phosphorus, 60% of the total FR weight is a brominated FR, and 30% of the total FR weight is the organic phosphate. In another example, formulation # 8 teaches a composition wherein 10% of the total FR weight is the source of nitrogen and inorganic phosphorus, 75% of the total FR weight is a brominated FR, and 15% of the total FR weight is the organic phosphate.

According to another preferred embodiment, component 3, namely the source of nitrogen and inorganic phosphorus, is set at about 20% weight of the total FR weight, thus setting the overall % weight of the other FR components (component 1: the brominated FR and component 2: the organic phosphate that is in a disordered structure) to be 80% of the total FR weight. For example, formulation # 5 teach a composition wherein 20% of the total FR weight is the source of nitrogen and inorganic phosphorus, 50% of the total FR weight is a brominated FR, and 30% of the total FR weight is the organic phosphate.

According to yet another preferred embodiment, component 3, namely the source of nitrogen and inorganic phosphorus, is set at about 25% weight of the total FR weight, thus setting the overall % weight of the other FR components (component 1: the brominated FR and component 2: the organic phosphate that is in a disordered structure) to be about 75% of the total FR weight. For example, formulations # 6 and 7 teach compositions wherein respectively 24% and 23% of the total FR weight is the source of nitrogen and inorganic phosphorus, and in one case (formulation # 6) 38% of the total FR weight is a brominated FR, and 38% of the total FR weight is the organic phosphate, and in another case (formulation # 7) 35% of the total FR weight is a brominated FR, and 42% of the total FR weight is the organic phosphate.

Additional such combinations are possible and are easily determined by a person skilled in the art.

It should be further noted that in the brominated FR can also act as the organic phosphate, and in this case, the amount of the brominated FR will be completing the amount of the source of nitrogen and inorganic phosphorus. For example, formulation # 18 contains 10% of the source of nitrogen and inorganic phosphorus and 90% of the brominated FR which is also an organophosphate.

As understood from the previous sections, the term "composition", as used herein in the context of a "flame retardant composition", refers to any compound and/or a combination of compounds that have flame retardant properties.

Flame retardant compositions may optionally include a carrier and additional, non-FR ingredients, which are typically used to stabilize the composition.

Therefore, according to another aspect of the invention, there is now provided a flame retardant formulation comprising any of the compositions of the present invention, and an aqueous carrier.

Preferably, this formulation is a textile coating application.

The term "aqueous carrier", as used herein, means water and/or any water soluble materials suitable for use as solvents.

The term "formulation" as used herein, refers to a composition, as defined hereinabove, which is formulated so as to facilitate and/or enable its application on a substrate. Thus, a flame retardant formulation, as used herein, typically includes a flame retardant composition as defined hereinabove, a carrier and optionally additives such as a binder, a FR synergist, additional FRs, as well as non-FR additives.

According to additional preferred embodiments of the invention, the formulations described herein further comprise a wetting agent and/or a thickening agent. These agents are typically added in an amount of up to 5% by weight each.

Examples of suitable wetting agents, dispersing agents and thickeners are known in the field of textile flame retardation and can be easily determined by a person skilled in the art.

Additional compounds may be added to the formulation to modify its color, fluidity, pH, etc. Some non-limiting examples of common additives in textiles include a surface active agent, an antifoaming agent, a preservative, a stabilizing agent, a binding agent, a thickening agent, a wetting agent, a suspending agent, a pH buffer, an anti-creasing agent, a sequestering agent, a detergent, a dye, and a pigment. Optionally more liquid carrier is added to the formulation.

Therefore, according to one preferred embodiment of the present invention, there is now provided a flame retardant formulation, further comprising one or more additives selected from the group consisting of a flame retardant synergist, a smoldering suppressant agent, a surface active agent, an antifoaming agent, a preservative, a stabilizing agent, a binding agent, a thickening agent, a wetting agent, a suspending agent, a pH buffer, an anti-creasing agent, a sequestering agent, a detergent, a dye, a pigment and any mixture thereof.

This formulation is preferably a substantially antimony-free formulation.

More preferably, this formulation is an antimony-free formulation.

It should be clarified that the dry solid content of the formulations taught in Table 5, and which ranges 40-50% by weight, is the total amount of all the solids which form part of the formulation. This includes the brominated flame retardants (BrFRs, component 1) in an amount ranging 24-40% by, the organic phosphate (component 2) in an amount ranging 10-15% by weight, and the source of nitrogen and inorganic phosphorus (component 3, which also acts as a smoldering suppression agent) in an amount ranging 1-6% by weight, the binder solids in an amount ranging from 5% to 10% by weight, the dispersion agent in an amount of up to 5% by weight, as well as any other solid components added to the formulation, such as wetting agent, thickener etc.

Given the application of these formulations on textile fabrics, it is necessary that the particles of the various flame retardant solids used as part of the FR coating will be smaller than the average fabric fiber size (which is around 4 microns), so that they do not fall off the fabric and will well adhere to the surface of the fabric.

Preferably, the $d_{99}$ of the flame retardant particles (all three components) need to be lower than 45 microns. These particles are obtained by dry milling or wet milling of any solid component of the composition, such as the coarse flame retardant components 1-3.

Since the present invention is intended for use on textiles and fabrics, the formulation of the present invention is preferably prepared and applied as an aqueous dispersion.

Therefore, according to another preferred embodiment of the present invention, the formulation taught in the present invention is in the form of an aqueous dispersion.

The term "aqueous dispersion", also known as latex, is understood to mean, for the purposes of the present invention, the dispersion of a flame retardant composition in an aqueous carrier, such as water. The aqueous dispersion is usually characterized by a concentration of solids ranging from 20% by weight to 40% by weight. The solid content includes all the components of the formulations that are not the aqueous carrier, such as the flame-retardant (FR), binder, dispersing agent, flame retardant synergistif present, smoldering suppression agent, wetting agent, thickener etc.

The term "dispersion" as used herein means a two-phase system in which one phase generally consists of substantially finely-divided particles, which are typically distributed throughout a bulk substance, the particles being the "dispersed" phase and the bulk substance or carrier, being the "continuous" phase. Dispersions include, for example, liquid/liquid forms (emulsions) and solid/liquid forms (solutions, suspensions or colloidal dispersions).

The dispersions of the flame retardants of the present invention were found to be stable for at least 14 days under room temperature conditions, whereas no settling or separation of the dispersions was observed.

In order to obtain these stable dispersions, the formulation described herein may further include a stabilizing agent (also termed herein interchangeably as a "suspending agent" or "thickening agent"). The use of a stabilizing agent contributes to the stability and homogeneity of the FR formulation. The thickening agent is added as the final component during the preparation of the formulation.

Examples of stabilizing agents and/or suspending agents and/or thickening agents that are suitable for use in the context of the present invention include, but are not limited to, acrylic acids, acrylic acids ester copolymer neutralized sodium polycarboxyl such as naphthalene sulfonic acid-formaldehyde condensate sodium salt, alginates, cellulose derivatives and xanthan.

In some cases, a dispersing agent is added in an amount ranging from 0.5 weight percentages to 5 weight percentages of the total weight of the formulation.

Preferably, the dispersing agent is selected from the group comprising of Dispergator WA, AMP-95, Clorocontin NGD and Triton X-100®, DisperByk 2010, Supragil WP. Further preferably, the dispersing agent is a nonionic surface active agent, such as Disperbyk 2010 with Supragil WP®.

According to preferred embodiments of the present invention, the formulation described herein further includes a binding agent (also termed herein interchangeably as a "binder"). The use of a binder contributes to the adherence of the molecules of a flame retardant composition (herein components 1, 2 and 3), to the substrate, herein the textile fabric.

As discussed in detail hereinabove, brominated FRs are known as typically requiring a large amount of a binder to affix them to the textile substrate, which may typically reach about 50% by weight of the total FR formulation. Such a large amount of a binder results in high add-on, which, as is further discussed in detail hereinabove, is undesirable since it causes a deterioration of the textile properties, for example, resulting in a stiffening of the fabrics or fading of their shades, and may further lower the tear strength and abrasion properties of the fabric. Unfortunately, the high binder content also contributes in itself to flammability and dripping.

It has now been taught by the present inventors that the formulation described herein can be effectively applied on various substrates in the presence of relatively low concentrations of a binder. As can be seen in Tables 6-31, the dry additives content (which is calculated as the difference between the add-on and the total amount of FR) ranges from about 5 to 10%. This includes not only the binder, but also surfactants, and occasionally adhesives, wetting agents etc. So in fact, the binder concentration is even lower and ranges 2.5 to 5% on the fabric.

The binder used in the formulations described herein is chosen to be compatible with the flame retardants and the additional additives in the formulation and depending on the specific application.

Preferably, when the formulations described herein are applied on textiles, the binder selected is suitable for use on textiles, and is therefore selected to be both non-damaging to the aesthetical and textural properties of the fabric, and durable (to washing, drying, UV light etc.).

Representative examples of binders that are suitable for use on textiles include, without limitation, acrylates, polyurethanes, and PVC. Preferably, the binder used in the formulations described herein is an acrylate.

Examples of acrylates that are suitable for use as binders in the context of the present invention include, but are not limited to, 2-phenoxyethylacrylate, propoxylated 2 neopentyl glycol diacrylate, polyethylene glycol diacrylate, pentaerythritol triacrylate, 2-(2-ethoxyethoxy) ethyl acrylate, butyl acrylate, styrene, and others.

As shown in Examples 6-11 which follow, the formulations of the present invention were applied on textiles substrates, by methods known in the field of textile processing, and which include contacting the textile fabric with the formulation, and heating it.

Thus, according to still another aspect of the present invention there is provided a process of applying the flame retardant formulation as described herein onto a flammable textile fabric, the process comprising:

Contacting the flammable textile fabric with the flame retardant formulation described herein; and heating the flammable textile fabric.

The process, according to this aspect of the present invention, is affected by simply contacting a flammable textile fabric substrate with the flame retardant formulation described herein, whereby the contacting can be affected by any industrially acceptable manner. Subsequent to contacting the FR formulation, the substrate is heated to a temperature of from 140° C. to 180° C., preferably at about 160° C., whereby the temperature is dictated by the melting temperature of the flame retardant and by the curing temperature of the binding agent. The curing temperature is also related to the curing time and the type of substrate (at 160° C., about 4-6 minutes on fabric).

Except for nylon that is heated to about 145° C., the other fabrics are heating to at least 160° C.

The industrially acceptable manner in which the contacting is affected includes, for example, spreading, coating, padding, dipping, printing, foaming and/or spraying the FR formulation onto the substrate. Padding is a process that is typically used for applying the formulation on a textile substrate and is defined as a process in which the fabric is first passed through a padder containing the FR formulation, and is then squeezed between heavy rollers to remove any excess formulation. The process described herein can be affected, for example, either during the dying or the finishing stages of the substrate manufacture.

As is demonstrated in the Examples section that follows, the formulations and processes described herein were practiced so as to provide substrates having the brominated flame retardant formulations applied thereon.

Hence, according to a further aspect of the present invention there is provided an article-of-manufacture which comprises a flammable substrate and any of the flame retardant formulations described herein, being applied thereon.

The flammability of the textile flammable substrates of the present invention was determined by a 12 seconds ignition test, which is defined by ASTM D-6413, a test method used to measure the vertical flame resistance of textiles. According to this method a textile is classified on a pass/fail basis, according to predetermined criteria, usually of the "after-flame time", "after-glow time" and "char length" of the tested sample.

An "after-flame time" is defined herein and in the art as the time period during which the sample continues to burn after removal of the burner.

An "after-glow time" is defined herein and in the art as the time period during which the sample glows after the flame is extinguished.

A "char length" is defined herein and in the art as the distance from the edge of the fabric that was exposed to the flame to the end of the area affected by the flame. A char is defined as a carbonaceous residue formed as the result of pyrolysis or incomplete combustion.

More specifically, a textile is considered to have failed the 12 seconds ignition test, if its average "char length" exceeds 7 inches (17.8 cm) or an individual sample has a "char length" longer than 10 inches (25.4 cm). The flammability of the textile substrate may be further defined by its "after-flame time" and by its "after-glow time". A fabric is considered to have an excellent flame retardancy if either its "after-flame time" is 10 seconds or less. A fabric is considered to have a superior flame retardancy if its "after-flame time" is 5 seconds or less.

Optionally, since a low "after-glow time" is advantageous, the preferred "after-glow" time is less than 200 seconds, more preferably less than 150 seconds. However the flammability "pass/fail" is defined by the "after-flame" and "char length" only.

Using this method, it was demonstrated, for example, that padding a 100% cotton knitted fabric, or a 100% polyester fabric or a 50-50% cotton/polyester fabric or a 100% nylon fabric with the antimony-free formulations of the present invention, resulted in an "after flame" of 0-3 seconds (mostly 0-1 seconds).

Furthermore, the char length in all tested fabrics was as low as 6.5 cm, and in most cases did not exceed 15.5 cm.

Yet further, the "after-glow" was 0-2 seconds all types of fabric for 3-components systems.

Thus, according to one preferred embodiment of the invention, the flame retardant textile fabric described herein has an "after flame" time ranging from 0 seconds to 3 seconds and/or a char length mostly ranging from 10 to 17 cm.

As is further demonstrated in the Examples section that follows, when an FR formulations of the present embodiments was applied onto various textile fabrics, the flame resistance of the fabric, as defined by the "after-flame time", "after-glow time" and "char length", was obtained and maintained even after the fabric was contacted with hot water and a detergent, while being subjected to several washing cycles, as defined by Standard Laboratory Practice for Home Laundering (AATCC technical manual/2001). In fact, the flame resistance properties of textile fabrics treated with the FR formulations described herein were maintained even after the treated fabric was subjected to even 30 washing cycles.

Hence, it has been shown that the treated textile fabrics are characterized by enhanced washing fastness and that the flammable textile fabrics described herein have a durability of at least 5 washing cycles and even of 30 laundry cycles.

The term "washing fastness", which is also referred to herein interchangeably as "washing durability" or "laundry stability", refers to the ability of a substrate treated with the milled formulations of the present invention, to maintain its characteristic flame resistance and/or textural and/or aesthetical properties, after being subjected to at least one washing cycle, as defined by Standard Laboratory Practice for Home Laundering (AATCC technical manual/2001).

As discussed in the Background section hereinabove, textile flammability and textile smoldering are major concerns since textiles are used in all fields of life. Some textile-based articles of manufacture, such as garments, linen and some decorative or technical textiles, are subject to harsh usage (abrasion, exposure to various environmental conditions etc.) and therefore may need extensive, sometimes daily, cleaning and washing. Heretofore, fire proofing these articles of manufacture involved either using the few available non-flammable fabrics; coating flammable fabrics with large amounts of FR, thus often damaging the fabric properties; or applying low amounts of FR on the flammable fabric, but limiting its cleaning method to the expensive and burdensome dry cleaning method. Using the FR formulation presented herein, these garments or technical textiles may be fire proofed while maintaining the feel and look of the fabric, as a result of applying relatively small amounts of the formulation.

Other types of flammable textile fabrics, such as draperies, carpets, tents, sleeping bags, toys, wall fabrics, decorative fabrics, mattresses and upholsteries, are not washed as much as garments or linen. However, the major hazards that can be caused by the inherent flammability of these articles call for efficient fire proofing thereof, in addition to their durability during periodic cleaning. These articles of manufacture may easily be made fire proof, either by using a fabric treated by the formulation described herein during the manufacturing process, or by easily applying these formulations onto the final product.

As exemplified further below, the flame retardant formulations taught in the present invention have been successfully applied on a variety textile fabrics and rendered them flame retardant.

Thus, according to another aspect of the invention, there is now provided a textile coated by the formulation taught hereinabove. Similarly, there is now provided a textile flame retarded by any of the compositions described herein.

The terms "fabric", "textile" and "textile fabric" are used herein interchangeably to describe a sheet structure made from fibers.

The textile fabrics can be synthetic, natural or a blend thereof. Non-limiting examples of textile fabrics that can be beneficially used in the context of the present invention include wool, silk, cotton, linen, hemp, ramie, jute, acetate fabric, acrylic fabric, latex, nylon, polyester, rayon, viscose, spandex, metallic composite, carbon or carbonized composite, and any combination thereof. Representative examples of textile fabrics which were shown to be suitable for use in the context of the present invention include, without limitation, cotton, polyester, nylon and combinations thereof.

Throughout the examples, the terms "polyester fabric", "cotton fabric" etc. refer to fabrics composed of polyester fibers, cotton fibers, respectively.

Suitable fabrics to be successfully flame retarded by the formulations of the present invention include those composed of both synthetic and natural fibers.

The term "fiber" as used herein refers to a natural or synthetic filament capable of being spun into a yarn or made into a fabric.

Thus, the fabrics listed above are composed of the corresponding fibers, such as: wool, silk, cotton, linen, hemp, ramie, jute, acetate, lyocell, acrylic, polyolefin, polyamide, polylactic acid, polyester, rayon, viscose, spandex, metallic composite, ceramic, glass, carbon or carbonized composite, and any combination thereof.

The textile fabrics of this invention may be used as a single layer or as part of a multi-layer protective garment.

A textile substrate may be incorporated in various products, where it is desired to reduce the substrate flammability. Such products include, for example, draperies, garments, linen, mattresses, carpets, tents, sleeping bags, toys, decorative fabrics, upholsteries, wall fabrics, and technical textiles.

The flame retardancy was achieved for a variety of fabrics, at average and even at low add-ons, ranging from as low as 31% and no higher than 62% for most fabrics (for example cotton-polyester blends and nylon) even though these were antimony-free formulations, which are known to require an increased add-on in textile FR systems.

Thus, according to one preferred embodiment of the present invention, the flame-retarded textile fabric described herein is characterized by an add-on which is lower than 65% of the weight of the textile fabric per-se.

It should be noted that in attempts to flame retard cotton, usually very high add-ons are required: in the presence of brominated FRs and antimony as much as 90% add-on is necessary, and without antimony it is practically impossible to flame retard cotton with brominated FRs. Surprisingly, it has now been shown by the inventors that the antimony-free compositions and formulations of the present invention can be used on cotton at add-on concentrations of as low as 54-85%.

The flame retarded textiles of the present invention were further characterized by a low bromine content, ranging from about 4% to about 22% of the total weight of the fabric. This is exceptional for antimony free formulations, where the bromine content is usually at least 40% of the total weight of the fabric, and in cotton even larger amounts (exceeding 50% by weight). In fact, the present range of 4-22% bromine in the fabric is in the range of add-ons required for antimony containing formulation, and even at its lower range.

The flame retarded textiles of the present invention were further characterized by an organic phosphorus content, ranging from about 0.7% to about 3% of the total weight of the fabric, well in the range of common organic Phosphorus FR formulations.

The flame retarded textiles of the present invention were further characterized by an inorganic phosphorus content, ranging from about 0.54% to about 3% of the total weight of the fabric, well in the range of common inorganic Phosphorus FR formulations.

It has been shown that textiles coated with the formulations described herein were characterized by feel and appearance similar to those of a non-treated fabrics. For example, properties such as the flexibility, smoothness and streak-free look of a non-treated textile were largely maintained upon application of the FR formulation. Furthermore, these textural and aesthetical properties were largely maintained also upon subjecting the treated fabrics to several washing cycles.

Thus, the flame-retarded textile fabric described herein is also characterized by at least one aesthetical or textural property which is substantially the same as that of said textile fabric per se.

The phrase "flammable textile fabric per se" as used hereinafter, refers to a flammable textile fabric which was not treated with the flame retardant formulation.

One particularly important aesthetical property is the transparency of the coating.

An important feature of the fabrics treated by the flame retardant compositions and formulations of the present invention, is that they are antimony-free.

Therefore, according to one especially preferred embodiment of the present invention, the flame retarded textile substrate of the present invention is a substantially antimony-free fabric, more preferably an antimony-free fabric. Antimony compounds have come under scrutiny for health aspects and also significantly increase the price of the formulation. Environmental awareness organizations such as OEKO-TEX forbid the use of extractable antimony in any textile formulation. Thus antimony free flame retarded fabrics represent a viable and useful alternative.

As shown in the examples further below, when using durable flame retardant compositions and/or formulations, as detailed hereinabove, enhanced washing durability could be obtained, thereby resulting in durable textiles.

Thus, according to preferred embodiments of the present invention, there is now provided a durable textile flame retarded by the compositions of the present invention, wherein the inorganic phosphate salt is an amorphous, non-water soluble at room temperature, and non-hydrolyzable. These textiles can undergo many washing cycles, and therefore be most suitable for textile articles of manufacture that require enhanced durability, such as cloths and linen.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Materials and Analytical Methods

Materials:
The Following Brominated Polymers Were Obtained From ICL-IP:
  TexFRon 4001 (Tetrabromobisphenol A diglycidyl ether copolymer, CAS Number 68928-70-1)
  TexFRon 4002 (2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol, CAS# 135229-48-0)
  TexFRon 9001 (Tetrabromobisphenol A bis (2,3 dibromopropyl ether) CAS# 21850-44-2)
  TexFRon P (proprietary polymeric brominated flame retardant)
  FR 1410 (Decabromodiphenyl Ethane, CAS# 84852-53-9)
  FR 370 (TexFRon 3000, Tris(tribromoneopentyl) phosphate, CAS# 19186-97-1)
SAYTEX® BT-93 brominated flame retardant (Ethylenebistetrabromophthalimide, CAS 32588-76-4) was obtained from ALBEMARLE Corp.
Emerald Innovation™ 1000 brominated flame retardant (Brominated proprietary polymeric) was obtained from Chemtura.

Organic Phosphates were obtained from ICL-IP:
  Resorcinol-bis (diphenylphosphate) (RDP, or High Purity RDP, RDP-HP, CAS# 125997-21-9).
  Fyrol® PCF (Tris (2-chloroi sopropyl) phosphate, CAS 13674-84-5).
  Phosflex® 362 (2-Ethylhexyl Diphenyl Phosphate, CAS: 2-ethlhexyl diphenyl phosphate 1241-94-7, Triphenyl phosphate 115-86-6)
  Phosflex® 71B (Butylated triphenyl phosphate ester, CAS: t-butylphenyl diphenyl phosphate 56803-37-3, bis (t-butylphenyl) phenyl phosphate 65652-41-7, Tri (t-butylphenyl) phosphate 78-33-1, Triphenyl phosphate 115-86-6)
  Sol-DP™ (hydroquinone bis diphenyl phosphate, CAS# 51732-57-1) was obtained from ICL-IP
Source of Nitrogen and Inorganic Phosphorus:
  TexFRon AG (proprietary Aluminum Ammonium Super polyphosphate) was obtained from ICL-IP, and its preparation is described in U.S. Pat. No. 8,524,125.
  Ammonium polyphosphate (APP, CAS# 68333-79-9) was obtained from ICL-PPLP.
  MPP (Melamine poly phosphate, CAS# 20208-95-1) was obtained from Ciba PLEASE COMPLETE
Other Materials:
  Disperbyk 2010 (dispersing agent) was obtained from BYK Addtives and Instrument.
  Supragil® WP (wetting agent) was obtained from Rhodia.
  CELLOSIZE™ HEC QP-100MH (thickener) was obtained from DOW.
  AC-178 binder and GP acrylic thickening agent were obtained from B. G. Polymers.
Weight Percentage Calculations and Definitions:
  The percentage of additives on the fabric ("Add-on") was determined by the difference between sample weight before and after application of the FR formulation, after drying of the formulation on the fabric (deviation of ±1%). The weight of the formulation includes the flame retardant weight (% FR) as well as the weight of any other additives, such as surfactants and binder.
  The percentage of total flame retardant in the FR composition (% FR): was calculated by adding the weight percentages of the three FR components: the brominated FR(s) (component 1), the organic phosphate(s) (component 2) and the source of nitrogen and inorganic phosphorus (component 3). For example, in sample 2349-34-02 hereinbelow, the brominated FR (component 1) is BT-93 which is present in an amount of 21.49% by weight; the organic phosphate (component 2) is RDP which is present in an amount of 10.74% by weight; and the source of nitrogen and inorganic phosphorus (component 3) is TexFRon AG which is present in an amount of 3.58% by weight. Thus, the total % FR is 35.81% by weight.
  The difference between % add-on and % FR: In all of the examples, there is a few percentage difference between the % add-on and the % FR. This difference reflects the total weight of the any other additives, such as surfactants and binder. For example, in the previous example, the % add-on was 40.71%, while the total % FR was 35.81%. Thus, the 4.9% difference reflects the weight of the surfactant and binder within the dry formulation.
  The bromine content on the fabric (% Br) was calculated using the % FR, and knowing the weight ratio of bromine atoms for each brominated FR. For example, if the brominated FR is TexFRon 4002 (2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol), the weight % of bromine within the FR molecule is 56%. Therefore, in sample 2349-03-08, the FR-4002 FR content was 30.77% weight, and hence the % bromine was calculated by multiplying this number by 0.56 to obtain 17.2% bromine.

The bromine % of several commonly used FRs is provided in the table below:

| FR | % bromine (weight) |
|---|---|
| BT-93 | 67 |
| TexFRon 4002 | 56 |
| TexFRon 4001 | 50 |
| TexFRon 9001 | 68 |
| TexFRon P | 19 |
| TexFRon 3000 (FR 370) | 70 |
| FR 1410 | 82 |
| Emerald Innovation ™ 1000 | 78 |
| FR-122P | 65 |
| FR 803 | 66 |
| FR 1025 | 71 |

The organic Phosphorus content on the fabric (% OP) was calculated using the % of the organic phosphate as part of the % FR, and knowing the weight ratio of phosphorus atoms for each organic phosphate. For example, if the organic phosphate is Resorcinol-bis(diphenylphosphate) (RDP), the weight % of phosphorus within the organic phosphate molecule is 10.8%. Therefore, in sample 2349-03-08, the RDP content was 15.03% weight, and hence the % organic phosphate was calculated by multiplying this number by 0.108 to obtain 1.61% organic phosphate.

The organic phosphorus % of several commonly used organic phosphates is provided in the table below:

| FR | % OP (weight) |
|---|---|
| RDP | 10.8 |
| Fyrol PCF | 9.5 |
| Phosflex ® 362 | 8.5 |
| Phosflex ® 71B | 8.5 |

The inorganic Phosphorus content on the fabric (% INP) was calculated using the % of the inorganic phosphorus as part of the % FR, and knowing the weight ratio of phosphorus atoms for each inorganic phosphorus component. For example, if the source of nitrogen and inorganic phosphorus is TexFRon AG, the weight % of phosphorus within the TexFRon AG molecule is 21%. Therefore, in sample 2349-03-08, the TexFRon AG content was 6.26% weight, and hence the % source of nitrogen and inorganic phosphorus was calculated by multiplying this number by 0.21 to obtain 1.31% source of nitrogen and inorganic phosphorus.

The inorganic phosphorus % (% IPN) of several suitable sources of nitrogen and inorganic phosphorus is provided in the table below:

| FR | % IPN (weight) |
|---|---|
| TexFRon AG | 21 |
| MPP | 30 |
| APP | 31-32 |

Textile Flammability Tests:

ASTM D 6413 12 seconds ignition test: In this method, samples are cut from the fabric to be tested, and are mounted in a frame that hangs vertically from inside the flame chamber. A controlled flame is exposed to the sample for a specified period of time (in this case for 12 seconds, one of the strictest flammability tests), and the "after-flame time" and the "after-glow time" are both recorded. Finally, the sample is torn by use of weights and the char length is measured. To pass, the average char length of five samples cannot exceed 7 inches (17.8 cm). In addition, none of the individual specimens can have a char length of 10 inches (25.4 cm). The sample is further classified as passing the test if its "after flame time" is less than 5 seconds, and its "after glow time" is less than 150 seconds, so as to render the sample applicable even in the stricter "children's nightwear" flammability standards.

Textile Washing Fastness Tests:

Samples treated with formulations described herein were subjected to 5 successive washing cycles in accordance with the washing procedure set forth below, followed by one drying cycle in accordance with commonly used drying procedure, based on the Standard Laboratory Practice for Home Laundering (AATCC technical manual/2001).

In all washing cycles, the temperature of the washing water is maintained between 58° C. and 62° C., for automatic washing machines, the washing cycle is set for normal washing cycle, and a synthetic detergent that conforms to Standard Laboratory Practice for Home Laundering (AATCC technical manual/2001) is used.

Example 1

Preparation of a TexFRon 4002 Dispersion

TexFRon 4002 (100 grams) having a size distribution of $d_{50}$<5 micron $d_{90}$<15 micron $d_{99}$<35 micron, was added to a mixed solution of deionized water (104 grams), dispersing agent Disperbyk 2010 (4 grams) and wetting agent Supragil WP (0.4 grams). The dispersion was allowed to mix for fifteen minutes and an acrylic binder AC-178 (25 grams) was added to the mixed dispersion and the dispersion was allowed to mix for fifteen minutes and thickened by adding a small amount of hydroxyethylcellulose (0.3 grams). The composition of the dispersion is detailed in Table 1 below:

Formulation quantities are provided for 100gr TexFRon 4002, at 50% solids content by weight:

TABLE 1

| Component | Amount [grams] | Remarks |
|---|---|---|
| Water | 104.0 | |
| Dispersion agent (surfactant) | 4.0 | 4% relative to active ingredient (FR) |
| Wetting agent | 0.40 | 10% relative to surfactant |
| TexFRon 4002 (brominated FR) | 100.0 | |
| AC-178 binder | 25.0 | 25% relative to active ingredient (FR) |

Example 2

Preparation of a TexFRon AG Dispersion (Source of Nitrogen and Inorganic Phosphorus)

TexFRon AG (100 grams) having a size distribution of d50<5 micron d90<15 micron d99<35 micron, was added to a mixed solution of deionized water (104 grams), dispersing agent Disperbyk 2010 (4 grams) and wetting agent Supragil WP (0.4 grams). The dispersion was allowed to mix for fifteen minutes and an acrylic binder AC-178 (25 grams) was added to the mixed dispersion and the dispersion was allowed to mix for fifteen minutes and thickened by adding a small amount of hydroxyethylcellulose (0.3 grams). The composition of the dispersion is detailed in Table 2 below:

Formulation quantities are provided for 100gr TexFRon AG, at 50% solids content by weight:

TABLE 2

| Component | Amount [gr] | Remarks |
|---|---|---|
| Water | 104.0 | |
| Dispersion agent (surfactant) | 4.0 | 4% relative to active ingredient (FR) |
| Wetting agent | 0.40 | 10% relative to surfactant |
| TexFRon AG (source of nitrogen and inorganic phosphorus) | 100.0 | |
| Binder AC-178 | 25.0 | 25% relative to active ingredient (TexFRon AG) |

The same process was repeated for preparing the other tested source of nitrogen and inorganic phosphorus, such as ammonium polyphosphate (APP) and melamine polyphosphate (MPP).

Example 3

Preparation of RDP Dispersion (Organic Phosphate)

Resorcinol-bis(diphenylphosphate) (RDP, 100 grams) was added to a mixed solution of deionized water (104 grams), dispersing agent Disperbyk 2010 (4 grams) and wetting agent Supragil WP (0.4 grams). The dispersion was allowed to mix for fifteen minutes and an acrylic binder AC-178 (25 grams) was added to the mixed dispersion and the dispersion was allowed to mix for fifteen minutes and thickened by adding a small amount of hydroxyethylcellulose (0.3 grams). The composition of the dispersion is detailed in Table 3 below:

Formulation quantities are provided for 100gr of RDP-HP, at 50% solids content by weight:

TABLE 3

| Component | Amount [gr] | Remarks |
|---|---|---|
| Water | 104.0 | |
| Dispersion agent (surfactant) | 4.0 | 4% relative to active ingredient (FR) |
| Wetting agent | 0.40 | 10% relative to surfactant |
| RDP (organic phosphate) | 100.0 | |
| Binder AC-178 | 25.0 | 25% relative to active ingredient (RDP FR) |

The same process was repeated for preparing the other organic phosphates, such as Fyrol PCF (Tris (2- chloroisopropyl) phosphate, CAS 13674-84-5), Phosflex® 362 (2-Ethylhexyl Diphenyl Phosphate, CAS: 2-ethlhexyl diphenyl phosphate 1241-94-7, Triphenyl phosphate 115-86-6), Phosflex® 71B (Butylated triphenyl phosphate ester, CAS: t- butylphenyl diphenyl phosphate 56803-37-3, bis(t-butylphenyl) phenyl phosphate 65652-41-7, Tri (t- butylphenyl) phosphate 78-33-1, Triphenyl phosphate 115-86-6) and Sol-DP™ (hydroquinone bis diphenyl phosphate).

Example 4

Preparation of a Brominated FR Dispersions

TexFRon 9001 or any of the other brominated FRs listed in table 5 below (100 grams) having a size distribution of $d_{50}$<5 micron $d_{90}$<15 micron $d_{99}$<35 micron, was added to a mixed solution of deionized water (104 grams), dispersing agent Disperbyk 2010 (4 grams) and wetting agent Supragil WP (0.4 grams). The dispersion was allowed to mix for fifteen minutes and an acrylic binder AC-178 (25 grams) was added to the mixed dispersion and the dispersion was allowed to mix for fifteen minutes and thickened by adding a small amount of hydroxyethylcellulose (0.3 grams). NOTE: TexFRon P was used as received. The composition of the dispersion is detailed in Table 4 below:

Quantities are provided for a 100gr formulation, at 50% solids content by weight.

TABLE 4

| Component | Amount [gr] | Remarks |
|---|---|---|
| Water | 104.0 | |
| Dispersion agent | 4.0 | 4% relative to active ingredient (FR) |
| Wetting agent | 0.40 | 10% relative to surfactant |
| Brominated FR | 100.0 | |
| binder | 25.0 | 25% relative to active ingredient (FR) |

Example 5

Preparation of Combined FR Formulations

TexFRon 4002 and other Brominated Flame Retardant (BFRs) were combined with an organic phosphate, such as RDP-HP and an source of nitrogen and inorganic phosphorus, such as TexFRon AG at different weight ratios and the dispersion was allowed to mix for fifteen minutes and thickened by adding a small amount of hydroxyethylcellulose (0.3 grams). The formulations were all stable, flowed smoothly and did not settle.

The various formulations that were prepared are summarized in Table 5:

TABLE 5

| Formulation | Brominated FR (BFR) | % BFR | Organic Phosphate (OP) | % OP | Inorganic P & N source (IPN) | % IPN |
|---|---|---|---|---|---|---|
| #1a comparative | 4002 | 80% | RDP | 20% | — | 0 |
| #1b comparative | — | 0 | RDP | 50% | TexFRon AG | 50% |
| #1c Comparative Incl. ATO | 4001 | 50% | — | 0 | TexFRon AG | 50% |

TABLE 5-continued

| Formulation | Brominated FR (BFR) | % BFR | Organic Phosphate (OP) | % OP | Inorganic P & N source (IPN) | % IPN |
|---|---|---|---|---|---|---|
| #1d comparative | 3000 | 100% | * | * | — | 0 |
| #1e comparative | 4002 | 60% | Sol-DP ™ | 30% | TexFRon AG | 10% |
| #2 | 4002 | 60% | RDP | 30% | TexFRon AG | 10% |
| #3 | 9001 | 60% | RDP | 30% | TexFRon AG | 10% |
| #4 | 1410 | 60% | RDP | 30% | TexFRon AG | 10% |
| #5 | 4002 | 50% | RDP | 30% | TexFRon AG | 20% |
| #6 | 4002 | 38% | RDP | 38% | TexFRon AG | 24% |
| #7 | 4002 | 35% | RDP | 42% | TexFRon AG | 23% |
| #8 | 4002 | 75% | RDP | 15% | TexFRon AG | 10% |
| #9 | TexFRon P | 60% | RDP | 30% | TexFRon AG | 10% |
| #10 | 4001 | 60% | RDP | 30% | TexFRon AG | 10% |
| #11 | BT-93 | 60% | RDP | 30% | TexFRon AG | 10% |
| #12 | Emerald 1000 | 60% | RDP | 30% | TexFRon AG | 10% |
| #13 | 4002 | 60% | Phosflex ® 362 | 30% | TexFRon AG | 10% |
| #14 | 4002 | 60% | Phosflex ® 71B | 30% | TexFRon AG | 10% |
| #16 | 4002 | 60% | RDP | 30% | APP | 10% |
| #17 | 4002 | 60% | RDP | 30% | MPP | 10% |
| #18 | 3000 | 90% * | * | * | TexFRon AG | 10% |

* includes both brominated FR and Organic phosphate in the same molecule

Example 6

Application of FR Formulations to 35%/65% Cotton/Polyester Woven Fabric

Fabrics were treated using a pad-squeeze-cure process. A 35%/65% cotton polyester woven 192 grams/m² fabric was padded with the formulations of Example 5, achieving a 35-60% dry add-on. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

A) 60% TexFRon 4002+30% RDP+10% TexFRon AG (formulation # 2, Table 5)

TABLE 6

| | | | | | | flammability test | | |
|---|---|---|---|---|---|---|---|---|
| Sample # | % add-on | % FR | % Br | % OP | % IPN | After flame sec | After Glow sec | Char Length cm |
| 2349-03-07 | 48.05 | RDP-12.2% 4002-24.98% AG-5.08% | 14.2 | 1.31 | 1.07 | 0 | 0 | 15 |
| 2349-03-08 | 59.17 | RDP-15.03% 4002-30.77% AG-6.26% | 17.2 | 1.61 | 1.31 | 0 | 0 | 14.5 |
| 2349-03-09 | 54.75 | RDP %-13.9 4002-28.46% AG-5.79% | 15.9 | 1.49 | 1.22 | 0 | 0 | 14 |
| 2349-03-10 | 48.93 | RDP %-12.43 4002 25.44% AG 5.17% | 14.2 | 1.33 | 1.09 | 0 | 0 | 15.5 |
| 2346-84-09 | 35.66 | RDP-10.23% 4002-18.41% AG-2.73% | 10.3 | 1.09 | 0.57 | 0 | 0 | 15.5 |
| 2346-84-10 | 37.93 | RDP10.-88% 4002-19.58% AG-2.90% | 10.9 | 1.16 | 0.61 | 0 | 0 | 15.5 |
| 2346-84-11 | 37.17 | RDP-10.66% 4002-19.19% AG-2.84% | 10.7 | 1.14 | 0.60 | 0 | 0 | 16 |

B) 60% FR 1410+30%RDP+10% TexFRon AG (formulation # 4, Table 5)

TABLE 7

| Sample # | % add-on | % FR | % Br | % OP | % IPN | flammability test After flame sec | After Glow sec | Char Length cm |
|---|---|---|---|---|---|---|---|---|
| 2349-18-08 | 35.91% | 1410-18.54% RDP-10.30% AG-2.75% | 15.20% | 1.10% | 0.58% | 0 | 0 | 10 |
| 2349-18-09 | 39.07% | 1410-20.17% RDP-11.21% AG-2.99% | 16.54% | 1.20% | 0.63% | 0 | 0 | 15 |
| 2349-18-10 | 38.25% | 1410-19.75% RDP-10.97% AG-2.93% | 16.19% | 1.17% | 0.61% | 0 | 0 | 10.5 |
| 2349-18-11 | 40.33% | 1410-20.82% RDP-11.75% AG-3.08% | 17.07% | 1.24% | 0.65% | 0 | 0 | 18 |
| 2349-18-12 | 38.12% | 1410-19.68% RDP-10.93% AG-2.92% | 16.14% | 1.17% | 0.61% | 0 | 0 | 12 |
| 2349-18-13 | 39.07% | 1410-20.17% RDP-11.21% AG-2.99% | 16.54% | 1.20% | 0.63% | 0 | 0 | 12 |
| 2349-18-14 | 37.17% | 1410-19.19% RDP-10.66% AG-2.84% | 15.74% | 1.14% | 0.60% | 0 | 0 | 10 |

C) 60% TexFRon 9001+30%RDP+10% TexFRon AG (formulation # 3, Table 5)

TABLE 8

| Sample # | % Add-on | % FR | % Br | % OP | % IPN | flammability test After flame sec | After Glow sec | Char Length cm |
|---|---|---|---|---|---|---|---|---|
| 2349-14-06 | 41.41% | 9001-21.38% RDP-11.88% AG-3.17% | 14.54% | 1.27% | 0.67% | 0 | 0 | 12 |
| 2349-14-07 | 41.79% | 9001-21.57% RDP-11.98% AG-3.20% | 14.67% | 1.28% | 0.67% | 0 | 0 | 11.5 |
| 2349-08-05 | 44.38 | RDP-12.73% 9001-22.85% AG-3.39% | 15.5 | 1.36 | 0.71 | 0 | 0 | 14.5 |
| 2349-08-06 | 45.08 | RDP-12.93% 9001-23.21% AG-3.45% | 15.8 | 1.38 | 0.72 | 0 | 0 | 15 |
| 2349-08-07 | 45.52 | RDP-13.05% 9001-23.44% AG-3.48% | 15.9 | 1.40 | 0.73 | 0 | 0 | 14.5 |
| 2349-08-08 | 46.09 | RDP-13.22% 9001-23.73% AG-3.52% | 11.2 | 1.41 | 0.74 | 0 | 0 | 14 |

D) 60% TexFRon P+30% RDP+10% TexFRon AG (formulation 9, Table 5)

TABLE 9

| Sample # | % Add-on | % FR | % Br | % OP | % IPN | Flammability Test After Flame (sec) | After Glow (sec) | Char Length (cm) |
|---|---|---|---|---|---|---|---|---|
| 2349-23-05 | 43.50 | P-26.10% RDP-11.48% AG-3.83% | 4.41 | 1.23 | 0.80 | 0 | 0 | 15.5 |

TABLE 9-continued

| Sample # | % Add-on | % FR | % Br | % OP | % IPN | After Flame (sec) | After Glow (sec) | Char Length (cm) |
|---|---|---|---|---|---|---|---|---|
| 2349-23-06 | 42.80 | P-25.68% RDP-11.29% AG-3.76% | 4.34 | 1.21 | 0.79 | 0 | 0 | 9.5 |
| 2349-23-07 | 40.90 | P-24.54% RDP-10.79% AG-3.60% | 4.14 | 1.15 | 0.76 | 0 | 0 | 10.4 |
| 2349-23-08 | 42.10 | P-25.26% RDP-11.11% AG-3.70% | 4.27 | 0.19 | 0.78 | 0 | 0 | 17.5 |

E) 60% BT-93+30% RDP+10% TexFRon AG (formulation 11 in Table 5)

TABLE 10

| Sample # | % add-on | % FR | % Br | % OP | % IPN | After Flame (sec) | After Glow (sec) | Char Length (cm) |
|---|---|---|---|---|---|---|---|---|
| 2349-34-01 | 41.73 | BT-93-22.02% RDP-11.01% AG-3.67% | 16.7 | 1.18 | 0.77 | 0 | 0 | 13 |
| 2349-34-02 | 40.71 | BT-93-21.49% RDP-10.74% AG-3.58% | 15.68 | 1.15 | 0.75 | 0 | 0 | 13.5 |
| 2349-34-03 | 40.59 | BT-93-21.42% RDP-10.71% AG-3.57% | 15.64 | 1.15 | 0.75 | 0 | 0 | 14 |
| 2349-34-04 | 42.74 | BT-93-22.55% RDP-11.28% AG-3.76% | 16.46 | 1.21 | 0.79 | 0 | 0 | 14 |

F) 60% Emerald 1000+30% RDP+10% TexFRon AG (formulation 12 in Table 5)

TABLE 11

| Sample # | % add on | % FR | % Br | % OP | % IPN | After Flame (sec) | After Glow (sec) | Char Length (cm) | Remarks |
|---|---|---|---|---|---|---|---|---|---|
| 2349-37-01 | 33.57 | Emerald 1000-17.72% RDP-8.86% AG-2.95% | 14.53 | 0.95 | 0.62 | 0 | 0 | 12 | smoke |
| 2349-37-02 | 36.16 | Emerald 1000-19.08% RDP-9.54% AG-3.18% | 15.65 | 1.02 | 0.67 | 0 | 0 | 8 | smoke |
| 2349-37-03 | 31.55 | Emerald 1000-16.65% RDP-8.32% AG-2.77% | 13.65 | 0.89 | 0.58 | 0 | 0 | 15 | smoke |
| 2349-37-04 | 32.75 | Emerald 1000-17.28% RDP-8.64% AG-2.88% | 14.17 | 0.92 | 0.60 | 0 | 0 | 13.5 | smoke |

G) 60% TexFRon 4002+30% Phosflex 362+10% TexFRon AG (formulation 13 in Table 5)

TABLE 12

| Sample # | % add-on | % FR | % Br | % OP | % IPN | Flammability Test ||| 
| | | | | | | After Flame (sec) | After Glow (sec) | Char Length (cm) |
| --- | --- | --- | --- | --- | --- | --- | --- | --- |
| 2349-40-12 | 40.97 | 4002-21.62%<br>Phosflex362-10.81%<br>AG-3.60% | 12.11 | 0.92 | 0.76 | 0 | 0 | 6.5 |
| 2349-40-13 | 39.70 | 4002-20.95%<br>Phosflex362-10.48%<br>AG-3.49% | 11.73 | 0.89 | 0.73 | 0 | 0 | 12.5 |
| 2349-40-14 | 40.97 | 4002-21.62%<br>Phosflex362-10.81%<br>AG-3.60% | 12.11 | 0.92 | 0.76 | 2 | 0 | 13 |

H) 60% TexFRon 4002+30% Phosflex 71B+10% TexFRon AG (formulation 14 in Table 5)

TABLE 13

| Sample # | % add-on | % FR | % Br | % OP | % IPN | Flammability Test ||| 
| | | | | | | After Flame (sec) | After Glow (sec) | Char Length (cm) |
| --- | --- | --- | --- | --- | --- | --- | --- | --- |
| 2349-43-01 | 39.64 | 4002-20.92%<br>71B-10.46%<br>AG-3.49% | 11.71 | 0.89 | 0.73 | 0 | 0 | 15 |
| 2349-43-02 | 39.39 | 4002-20.78%<br>71B -10.39%<br>AG-3.46% | 11.64 | 0.88 | 0.73 | 0 | 0 | 12 |
| 2349-43-03 | 34.58 | 4002-18.25%<br>71B -9.12%<br>AG-3.04% | 10.22 | 0.78 | 0.64 | 0 | 0 | 14 |

I) 60% TexFRon 4001+30% RDP+10% TexFRon AG (formulation 10 in Table 5)

TABLE 14

| Sample # | % add-on | % FR | % Br | % OP | % IPN | Flammability Test ||| 
| | | | | | | After Flame (sec) | After Glow (sec) | Char Length (cm) |
| --- | --- | --- | --- | --- | --- | --- | --- | --- |
| 2349-22-04 | 40.90 | 4001-21.59%<br>RDP-10.79%<br>AG-3.60% | 10.79 | 1.15 | 0.76 | 0 | 0 | 17.5 |
| 2349-22-05 | 42.67 | 4001-22.52%<br>RDP-11.26%<br>AG-3.75% | 11.26 | 1.20 | 0.79 | 0 | 0 | 13.5 |
| 2349-22-06 | 39.89 | 4001-21.05%<br>RDP-10.53%<br>AG-3.51 | 10.53 | 1.13 | 0.74 | 0 | 0 | 18.5 |

Example 7

Application of FR Formulations to 50%/50% Cotton Polyester Knit Fabric

Fabrics were treated using a pad-squeeze-cure process. A 50%/50% cotton polyester knit 205 grams/m² fabric was padded with the formulations of Example 5, achieving a 35-60% dry add-on. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

A) 60% TexFRon 4002, 30% RDP, 10% TexFRon AG (formulation # 2, Table 5)

TABLE 16

| Sample # | % add-on | % FR | % Br | % OP | % IPN | After flame sec | After Glow sec | Char Length cm |
|---|---|---|---|---|---|---|---|---|
| 2346-81-02 | 43.7 | RDP %11.36-4002-%23.25 AG-3.78% | 13.02 | 1.22 | 0.79 | 0 | 0 | 14 |
| 2346-81-03 | 45.5 | RDP11.84-%4002-%24.23 AG-3.94% | 13.57 | 1.27 | 0.83 | 0 | 0 | 16 |
| 2346-81-04 | 49.6 | RDP12.9%-4002-%26.41 AG-4.30% | 14.79 | 1.38 | 0.9 | 0 | 0 | 7.5 |
| 2346-81-05 | 41.1 | RDP10.7%-4002 %21.9 AG 3.56% | 12.27 | 1.14 | 0.75 | 0 | 0 | 13 |
| 2346-81-06 | 49.7 | RDP12.92%-4002 %26.45 AG 4.3% | 14.81 | 1.38 | 0.9 | 0 | 0 | 14 |
| 2346-84-01 | 32.85 | RDP-%9.42 4002-%16.96 AG-2.51% | 9.50 | 1.01 | 0.53 | | BEL | |
| 2346-84-02 | 32.31 | RDP9.27-%4002-%16.68 AG-2.47% | 9.34 | 0.99 | 0.52 | | BEL | |
| 2346-84-03 | 33.95 | RDP-9.74% 4002-17.52% AG-2.60% | 9.81 | 1.04 | 0.55 | 2 | 2 | 16 |
| 2346-84-04 | 33.67 | RDP-9.66% 4002 17.38% AG 2.58% | 9.74 | 1.03 | 0.54 | | BEL | |
| 2346-84-05 | 36.47 | RDP-10.46% 4002 18.83% AG-2.79% | 10.54 | 1.12 | 0.59 | 0 | 0 | 16 |
| 2346-84-16 | 34.63 | RDP-9.93% 4002 17.88% AG-2.65% | 10.01 | 1.06 | 0.56 | 0 | 0 | 16 |
| 2346-84-17 | 40.57 | RDP-11.64% 4002 20.94% AG-3.10% | 11.73 | 1.24 | 0.65 | 0 | 0 | 15 |

BEL = burnt entire length.

B) 60% TexFRon P+30% RDP+10% TexFRon AG (formulation 9 in table 5)

TABLE 17

| Sample # | % add-on | % Br | % OP | % IPN | After Flame (sec) | After Glow (sec) | Char Length (cm) |
|---|---|---|---|---|---|---|---|
| 2349-22-07 | 51.20 | 13.51 | 1.44 | 0.94 | 0 | 0 | 8 |
| 2349-22-08 | 45.94 | 12.12 | 1.29 | 0.84 | 0 | 0 | 11 |
| 2349-22-09 | 48.23 | 12.73 | 1.36 | 0.88 | 0 | 0 | 9.5 |

C) 60% TexFRon 4001+30% RDP+10% TexFRon AG (formulation 10 in Table 5)

TABLE 18

| Sample # | % add-on | % FR | % Br | % OP | % IPN | After Flame (sec) | After Glow (sec) | Char Length (cm) |
|---|---|---|---|---|---|---|---|---|
| 2349-22-07 | 51.20 | 4001-27.02 RDP-13.51% AG-4.5% | 13.51 | 1.45 | 0.95 | 0 | 0 | 8 |
| 2349-22-08 | 45.94 | 4001-24.24% RDP-12.12% AG-4.04% | 12.12 | 1.30 | 0.85 | 0 | 0 | 11 |
| 2349-22-09 | 48.23 | 4001-25.24% RDP-12.73% AG-4.24% | 12.73 | 1.36 | 0.89 | 0 | 0 | 9.5 |

D) Comparative example: 60% TexFRon 4002+30%RDP-HP, 10% ammonium polyphosphate (APP) (formulation 16 in Table 5). All samples before laundry.

TABLE 19

| Sample # | % add-on | % FR | % Br | % OP | % IPN | After Flame (sec) | After Glow (sec) | Char Length (cm) |
|---|---|---|---|---|---|---|---|---|
| 2233-19-04 | 41.89 | 4002-29.69% RDP-16.5% APP-4.4% | 16.6 | 1.77 | 1.32 | 0 | 3 | 9 |
| 2233-19-05 | 49.28 | 4002-34.93% RDP-19.41% APP-5.18% | 19.56 | 2.08 | 1.55 | 0 | 2 | 10 |
| 2233-19-06 | 31.54 | 4002-22.36% RDP-12.42% APP-3.3% | 12.52 | 1.33 | 0.99 | 0 | 2 | 11 |
| 2233-19-07 | 37.46 | 4002-26.65% RDP-14.75% AG-3.93% | 14.87 | 1.58 | 1.18 | 0 | 2 | 11 |

E) 60% TexFRon 4002+30% RDP-HP, 10% melamine polyphosphate (MPP) (formulation 17 in Table 5)

TABLE 20

| Sample # | % add-on | % FR | % Br | % OP | % IPN | After Flame (sec) | After Glow (sec) | Char Length (cm) | Remarks |
|---|---|---|---|---|---|---|---|---|---|
| 2233-20-02 | 31.54 | 4002-22.3% RDP-12.03% MPP-3.2% | 12.34 | 1.31 | 0.98 | 0 0 | 2 2 | 10 9 | Before laundry After 5 laundries |
| 2233-20-03 | 42.38 | 4002-29.6% RDP-16.45% MPP-4.39 | 16.58 | 1.76 | 1.32 | 0 0 | 2 2 | 10 11 | Before laundry After 5 laundries |
| 2233-20-04 | 55.93 | 4002-39% RDP-21.7% MPP-5.79% | 21.8 | 2.32 | 1.74 | 0 0 | 2 2 | 10 9 | Before laundry After 5 laundries |
| 2233-20-05 | 33.52 | 4002-23.4% RDP- 13% MPP-3.47% | 13.1 | 1.39 | 1.04 | 0 BEL | 2 | 11 | Before laundry After 5 laundries |

TABLE 20-continued

| Sample # | % add-on | % FR | % Br | % OP | % IPN | Flammability Test | | | Remarks |
|---|---|---|---|---|---|---|---|---|---|
| | | | | | | After Flame (sec) | After Glow (sec) | Char Length (cm) | |
| 2233-20-06 | 36.96 | 4002-25.82% RDP-14.34% MPP-3.82% | 14.46 | 1.53 | 1.15 | 0 | 2 | 11 | Before laundry |
| | | | | | | 0 | 2 | 11 | After 5 laundries |

Example 8

Application of FR Formulations to a 50%/50% Cotton Polyester (Woven) Fabric

Fabrics were treated using a pad-squeeze-cure process. A 50%/50% cotton polyester woven 175 grams/m² fabric was padded with the formulations of Example 5, achieving a 33-65% dry add-on. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

A) 38% TexFRon 4002+38% RDP+24% TexFRon AG (formulation # 6, Table 5) before and after laundry

TABLE 21

| Sample # | % add-on | % FR | % Br | % OP | % IPN | Flammability Test | | | Remarks |
|---|---|---|---|---|---|---|---|---|---|
| | | | | | | After Flame (sec) | After Glow (sec) | Char Length (cm) | |
| 2346-95-01 | 52.74 | 4002-20.47% RDP-20.47% AG-5.46% | 11.46 | 2.19 | 1.15 | 0 | 0 | 13 | Before laundry |
| | | | | | | 0 | 0 | 13 | After 5 laundries |
| 2346-95-02 | 53.5 | 4002-20.75% RDP-20.75% AG-5.53% | 11.62 | 2.22 | 1.16 | 0 | 0 | 16.5 | Before laundry |
| | | | | | | 0 | 0 | 12.8 | After 5 laundries |
| 2346-95-03 | 50.46 | 4002-19.58% RDP-19.58% AG-5.22% | 10.96 | 2.09 | 1.10 | 0 | 0 | 11 | Before laundry |
| | | | | | | 1 | 0 | 10.6 | After 5 laundries |
| 2346-95-04 | 57.09 | 4002-22.15% RDP-22.15% AG-5.91% | 12.40 | 2.37 | 1.24 | 0 | 0 | 13 | Before laundry |
| | | | | | | 1 | 0 | 9.8 | After 5 laundries |
| 2346-95-05 | 64.63 | 4002-25.08% RDP-25.08% AG-6.69% | 14.04 | 2.68 | 1.40 | 0 | 0 | 13 | Before laundry |
| | | | | | | 1 | 0 | 12 | After 5 laundries |
| 2346-95-06 | 59.32 | 4002-23.02% RDP-23.02% AG-6.14% | 12.89 | 2.46 | 1.29 | 0 | 0 | 12 | Before laundry |
| | | | | | | 2 | 0 | 11 | After 5 laundries |

B) 60% FR 9001+30% RDP+10% TexFRon AG (formulation #3 in Table 5)

TABLE 22

| Sample # | % add-on | % FR | % Br | % OP | % IPN | flammability test | | |
|---|---|---|---|---|---|---|---|---|
| | | | | | | After flame sec | After Glow sec | Char Length cm |
| 2349-14-03 | 35.93% | 9001-18.35% RDP-10.30% AG-2.75% | 12.61% | 1.10% | 0.58% | 0 | 0 | 16 |
| 2349-14-04 | 36.41% | 9001-18.79% RDP-10.44% AG-2.78% | 12.78% | 1.12% | 0.58% | 0 | 0 | 15 |
| 2349-18-05 | 36.20% | 9001-18.69% RDP-10.38% AG-2.77% | 12.71% | 1.11% | 0.58% | 0 | 0 | 14.5 |

C) 60% FR 1410+30% RDP+10% TexFRon AG 50%/50% cotton polyester (woven) (formulation # 4, Table 5)

TABLE 23

| | | | | | | flammability test | | |
|---|---|---|---|---|---|---|---|---|
| Sample # | % add-on | % FR | % Br | % OP | % IPN | After flame sec | After Glow sec | Char Length cm |
| 2349-18-01 | 36.34% | 1410-18.76% RDP-10.42% AG-2.78% | 15.38% | 1.12% | 0.58% | 0 | 0 | 13.5 |
| 2349-18-02 | 34.63% | 1410-17.88% RDP-9.93% AG-2.65% | 14.66% | 1.06% | 0.56% | 0 | 0 | 18.5 |
| 2349-18-03 | 34.15% | 1410-17.63% RDP-9.79% AG-2.61% | 14.46% | 1.05% | 0.55% | 0 | 0 | 16 |
| 2349-18-04 | 34.02% | 1410-17.56% RDP-9.76% AG-2.60% | 14.40% | 1.04% | 0.55% | 0 | 0 | 21.4 |
| 2349-18-05 | 36.06% | 1410-18.62% RDP-10.34% AG-2.76% | 15.27% | 1.11% | 0.58% | 0 | 0 | 13 |
| 2349-18-06 | 33.27% | 1410-17.17% RDP-9.54% AG-2.54% | 14.08% | 1.02% | 0.53% | 0 | 0 | 13 |
| 2349-18-07 | 33.02% | 1410-17.14% RDP-9.52% AG-2.54% | 14.05% | 1.02% | 0.53% | 0 | 0 | 18 |

D) 60% TexFRon P+30% RDP+10% TexFRon AG (formulation 9 in Table 5) was tested and passed the flammability tests at an add-on of 40.9%.

E) 60% TexFRon 4001+30% RDP+10% TexFRon AG (formulation 10 in Table 5) was tested and only succeeded at an add-on of 39%.

F) 60% BT-93+30% RDP+10% TexFRon AG (formulation 11 in Table 5 was tested and only succeeded at an add-on of 34.6%.

G) 60% Emerald 1000+30% RDP+10% TexFRon AG (formulation 12 in Table 5) was tested and only succeeded at an add-on of 31.5%.

H) 60% TexFRon 4002+30% Phosflex 362+10% TexFRon AG (formulation 13 in Table 5)

TABLE 24

| | | | | | | Flammability Test | | |
|---|---|---|---|---|---|---|---|---|
| Sample # | % add-on | % FR | % Br | % OP | % IPN | After Flame (sec) | After Glow (sec) | Char Length (cm) |
| 2349-40-09 | 34.49 | 4002-18.20% Phosflex 362-9.10% AG-3.03% | 10.19 | 0.77 | 0.64 | 0 | 0 | 13 |
| 2349-40-10 | 33.81 | 4002-17.84% Phosflex 362-8.92% AG-2.97% | 9.99 | 0.76 | 0.62 | 0 | 0 | 17 |
| 2349-40-11 | 35.11 | 4002-18.53% Phosflex362-9.26% AG-3.09% | 10.38 | 0.79 | 0.65 | 0 | 0 | 19 |

I) 60% TexFRon 4002+30% Phosflex 71B+10% TexFRon AG (formulation 14 in Table 5)

TABLE 25

| | | | | | | Flammability Test | | |
|---|---|---|---|---|---|---|---|---|
| Sample # | % add-on | % FR | % Br | % OP | % IPN | After Flame (sec) | After Glow (sec) | Char Length (cm) |
| 2349-43-04 | 37.16 | 4002-19.61% 71B -9.80% AG-3.27% | 10.98 | 0.83 | 0.69 | 0 | 0 | 15.5 |

TABLE 25-continued

|  |  |  |  |  |  | Flammability Test | | |
|---|---|---|---|---|---|---|---|---|
| Sample # | % add-on | % FR | % Br | % OP | % IPN | After Flame (sec) | After Glow (sec) | Char Length (cm) |
| 2349-43-05 | 32.45 | 4002-17.12% 71B -8.56% AG-2.85% | 9.59 | 0.73 | 0.60 | 3 | 0 | 19 |
| 2349-43-06 | 34.49 | 4002-18.20% 71B -9.10% AG-3.03% | 10.19 | 0.77 | 0.64 | 0 | 0 | 13 |

J) 90% TexFRon 3000 (FR-370 containing an organic phosphate)+10% TexFRon AG (formulation 18 in Table 5)

TABLE 26

|  |  |  |  |  | Flammability Test | | | |
|---|---|---|---|---|---|---|---|---|
| Sample # | % add-on | % FR | % Br | % OP | After Flame (sec) | After Glow (sec) | Char Length (cm) | Remarks |
| 2143-61-01 | 61.7 | 28.73 | 20.11 | 0.86 | 0 | 46 | 9.5 | Before laundry |
|  |  |  |  |  | 0 | 49 | 12 | After 5 laundry cycles |
| 2143-61-02 | 53.17 | 24.74 | 17.32 | 0.74 | 0 | 22 | 7.0 | Before laundry |
|  |  |  |  |  | 2 | 30 | 14 | After5 laundry cycles |
| 2143-61-03 | 56.11 | 26.11 | 18.28 | 0.78 | 0 | 11 | 9.0 | Before laundry |
|  |  |  |  |  | 1 | 25 | 10 | After 5 laundry cycles |
| 2143-61-04 | 55.82 | 25.98 | 18.19 | 0.78 | 0 | 31 | 11.2 | Before laundry |
|  |  |  |  |  | 0 | 30 | 12 | After 5 laundry cycles |
| 2143-61-05 | 55.82 | 25.98 | 18.19 | 0.78 | 0 | 26 | 9 | Before laundry |
|  |  |  |  |  | 0 | 30 | 12 | After 5 laundry cycles |

Example 9

Application of Mixed Formulation to 100% Cotton Fabric (KNIT)

The mixed formulation # 7 prepared according to the process of Example 5, was applied on a 100% cotton fabric (KNIT). The results are presented in Table 27 below.

TABLE 27

|  |  |  |  |  |  | Flammability Test | | |
|---|---|---|---|---|---|---|---|---|
| Sample # | % add-on | % FR | % Br | % OP | % IPN | After Flame (sec) | After Glow (sec) | Char Length (cm) |
| 2346-89-10 | 77.27% | 4002-36.15% RDP-25.11% AG-6.70% | 20.25% | 2.69% | 1.41% | 1 | 0 | 17 |
| 2346-89-11 | 80.05% | 4002-37.45% RDP-26.01% AG-6.94% | 20.97% | 2.78% | 1.46% | 1 | 0 | 12.5 |
| 2346-89-12 | 84.99% | 4002-39.77% RDP-27.62% AG-7.36% | 22.27% | 2.96% | 1.55% | 0 | 0 | 11.5 |
| 2346-96-05 | 54.57% | 4002-19.21% RDP-23.06% AG-12.30% | 10.76% | 2.47% | 2.58% | 0 | 0 | 15 |
| 2346-96-06 | 60.83% | 4002-21.42% RDP-25.70% AG-13.71% | 11.99% | 2.75% | 1.83% | 0 | 2 | 12.7 |

Example 10

Application of FR Formulations to a 50%/50% Cotton Nylon (NyCo Fabric, Woven)

Fabrics were treated using a pad-squeeze-cure process. A 50%/50% cotton nylon woven fabric (NyCo military fabric) was padded with some formulations of Table 5, achieving a range 40-50% dry add-on. In one case (see item A below) the fabric was pretreated with a first layer of 35% RDP to increase softness, and was then coated with the stated ratios of the ternary system as detailed in the table. In another case (see item B below) the fabric was treated with a single coating of the antimony free ternary system.

Fabrics were cured at 145° C. for 4 minutes, laundered 5 times according to AATCC Standard Practice for Home Laundry at 60° C., bone dried and tested according to ASTM D 6413-08 vertical flame, 12 seconds ignition. Fabrics passed flammability test before and after 30 laundries.

A) 75% TexFRon 4002+15% RDP+10% TexFRon AG (formulation 8 in Table 5)

TABLE 28

| | | | | Flammability Test | | | |
|---|---|---|---|---|---|---|---|
| Sample # | % add-on | % Br | % IPN | After Flame (sec) | After Glow (sec) | Char Length (cm) | Remarks |
| 2233-13-01 | 47.27 | 9.22 | 2.23 | 0 | 0 | 6 | Before laundry |
| | | | | 0 | 0 | 7 | After 30 laundry cycles |
| 2233-13-02 | 49 | 10.26 | 2.29 | 0 | 0 | 6 | Before laundry |
| | | | | 0 | 0 | 8 | After 30 laundry cycles |
| 2233-13-03 | 48.49 | 10 | 2.28 | 0 | 0 | 7 | Before laundry |
| | | | | 0 | 0 | 6 | After 30 laundry cycles |
| 2233-13-04 | 47.75 | 9.88 | 2.28 | 0 | 0 | 6 | Before laundry |
| | | | | 0 | 0 | 7 | After 30 laundry cycles |
| 2233-13-05 | 49.86 | 10.45 | 2.3 | 0 | 0 | 6 | Before laundry |
| | | | | 0 | 0 | 6 | After 30 laundry cycles |

B) 60% TexFRon 4002+30% RDP+10% TexFRon AG (formulation # 2, Table 5)

TABLE 29

| | | | | | | Flammability Test | | |
|---|---|---|---|---|---|---|---|---|
| Sample # | % add-on | % FR | % Br | % OP | % IPN | After Flame (sec) | After Glow (sec) | Char Length (cm) |
| 2346-98-01 | 34.49% | 4002-17.80% RDP-9.89% AG-2.64% | 9.77% | 1.06% | 0.55% | 0 | 0 | 13 |
| 2346-98-02 | 34.99% | 4002-18.06% RDP-10.04% AG-2.68% | 10.12% | 1.07% | 0.56% | 0 | 0 | 12 |
| 2346-98-03 | 34.54% | 4002-17.83% RDP-9.91% AG-2.64% | 9.99% | 1.06% | 0.55% | 0 | 0 | 13 |
| 2346-98-04 | 33.70% | 4002-17.40% RDP-9.66% AG-2.58% | 9.74% | 1.03% | 0.54% | 0 | 0 | 11 |
| 2346-98-05 | 35.27% | 4002-18.21% RDP-10.12% AG-2.70% | 10.20% | 1.08% | 0.57% | 0 | 0 | 13 |
| 2346-98-06 | 34.71% | 4002-17.92% RDP-9.95% AG-2.65% | 10.03% | 1.07% | 0.56% | 0 | 0 | 13 |

Example 11

Multilayer Application of Ternary Antimony-Free FR Formulations on a 100% Nylon Fabric A Mathis coating machine (knife over roll) was used to backcoat the test fabrics, weighting 330 grams/m². Two or three passes on one side with intermediate curing at 160° C. in the Mathis forced air oven were required to obtain the desired add-on using a single layer or multiple layers.

A) RDP as 1ˢᵗ Layer and Two Layers of Formulation 8: First layer was RDP, 50% solids dispersion alone and then 2 layers of the ternary system with ratio: RDP 15%, AG 10%, 4002 75% (formulation # 8). Add on was between 41-62%. Fabrics passed flammability test before and after 6 laundries cycles. Hand was good.

TABLE 30

| | | | | | Flammability Test | | | |
|---|---|---|---|---|---|---|---|---|
| Sample # | % add-on | % Br | % OP | % IPN | After Flame (sec) | After Glow (sec) | Char Length (cm) | Remarks |
| 2349-79-01 | 50.48 | 10.4 | 1.35 | 0.52 | 2 | 2 | 9 | Before laundry |
| | | | | | 0 | 0 | 7 | After 6 laundry cycles |
| 2349-79-02 | 62.05 | 14.49 | 2.55 | 0.72 | 0 | 0 | 6 | Before laundry |
| | | | | | 0 | 0 | 6 | After 6 laundry cycles |
| 2349-79-03 | 41.45 | 8.27 | 1.26 | 0.41 | 2 | 2 | 9 | Before laundry |
| | | | | | 0 | 0 | 6 | After 6 laundry cycles |

B) Single layer of 90% TexFRon 3000(FR-370 containing an organic phosphate)+10% TexFRon AG (formulation 18 in Table 5)

TABLE 31

| | | | | | Flammability Test | | | |
|---|---|---|---|---|---|---|---|---|
| Sample # | % Add-on | % FR | % Br | % IPN | After Flame (sec) | After Glow (sec) | Char Length (cm) | Remarks |
| 2143-61-01 | 61.7 | 28.73 | 20.11 | 0.86 | 0 | 46 | 9.5 | Before laundry |
| | | | | | 0 | 49 | 12 | After 5 laundry cycles |
| 2143-61-02 | 53.17 | 24.74 | 17.32 | 0.74 | 0 | 22 | 7.0 | Before laundry |
| | | | | | 2 | 30 | 14 | After 5 laundry cycles |
| 2143-61-03 | 56.11 | 26.11 | 18.28 | 0.78 | 0 | 11 | 9.0 | Before laundry |
| | | | | | 1 | 25 | 10 | After 5 laundry cycles |
| 2143-61-04 | 55.82 | 25.98 | 18.19 | 0.78 | 0 | 31 | 11.2 | Before laundry |
| | | | | | 0 | 30 | 12 | After 5 laundry cycles |
| 2143-61-05 | 55.82 | 25.98 | 18.19 | 0.78 | 0 | 26 | 9 | Before laundry |
| | | | | | 0 | 30 | 12 | After 5 laundry cycles |

Comparative Example 12:

Application of Antimony-Free Binary Flame Retardant Systems on Various Fabrics

Antimony-free comparative formulations 1a, 1b, 1c and 1d were applied by padding on a variety of fabrics, including 100% cotton, 35-65% cotton/polyester and 50-50% cotton/polyester, as described in Examples XX-XX.

The results are summarized in Table 32 and some are also detailed in Tables 33-35:

TABLE 32

| Formulation # | BrFR | OP | IPN | Flame Retardancy (before laundry) |
|---|---|---|---|---|
| 1a (external organic phosphate) | ✓ | ✓ | | failed |
| 1b | | ✓ | ✓ | failed |
| 1c | ✓ | | ✓ | failed |
| 1d (internal organic phosphate) | ✓ | ✓ | | failed |

A) Application of formulation 1a (80% TexFRon 4002+20% RDP) on 50%-50% cotton polyester (knit) fabric

TABLE 33

| | | | | | flammability test | | |
|---|---|---|---|---|---|---|---|
| Sample # | % add-on | % FR | % Br | % OP | After flame sec | After Glow sec | Char Length cm |
| 2346-71-03-01 | 43.9 | RDP 6.93% 4002-27.2% | 15.2 | 0.73 | | | BEL |
| 2346-71-03-02 | 44.2 | RDP 6.98% 4002-27.4% | 15.3 | 0.74 | | | BEL |

BEL = burnt entire length.

B) Application of formulation 1d tris(tribromoneopentyl) phosphate (FR-370, TexFRon 3000) on a 50% cotton/50% polyester fabric

TABLE 34

| | | | | | Flammability Test | | | |
|---|---|---|---|---|---|---|---|---|
| Sample # | % add-on | % FR | % Br | % OP | After Flame (sec) | After Glow (sec) | Char Length (cm) | Remarks |
| 1979-62-03 | 27.12 | 19.77 | 13.81 | 0.54 | BEL | | | Before laundry |
| 1979-62-04 | 28.35 | 20.62 | 14.43 | 0.61 | BEL | | | Before laundry |
| 1979-62-08 | 36.54 | 26.58 | 18.6 | 0.79 | 13 FAIL | | | Before laundry |
| 1979-62-09 | 43.37 | 31.54 | 22.08 | 0.94 | 15 FAIL | | | Before laundry |

C) Application of formulation 1b (50% RDP-HP and 50% TexFRon AG) on a 35% cotton/65% polyester) fabric

TABLE 35

| | | | | | Flammability Test | | | |
|---|---|---|---|---|---|---|---|---|
| Sample # | % add-on | % FR | % OP | % IPN | After Flame (sec) | After Glow (sec) | Char Length (cm) | Remarks |
| 1979-62-03 | 37.8 | 16.2 | 1.8 | 3.4 | BEL | | | Before laundry |
| 1979-62-04 | 35.9 | 15.4 | 1.7 | 3.2 | BEL | | | Before laundry |
| 1979-62-08 | 36.6 | 15.7 | 1.7 | 3.3 | BEL | | | Before laundry |

D) Application of formulation 1c (50% 4001 and 50% TexFRon AG) including ATO at a ratio of 1:9 Sb:Br, on a 50% 50% cotton polyester knit fabric

TABLE 36

| | Sample # | % Add-on | % FR | % Br | % ATO | Br:Sb Molar ratio | flammability test | | | |
|---|---|---|---|---|---|---|---|---|---|---|
| | | | | | | | After flame sec | After Glow sec | Char Length cm | remarks |
| TexFRon 4001 + | 2120-12-02 | 59.0 | 21.0 | 10.5 | 2.1 | 1:9 | 0 | 2 | 12 | Before laundry |
| TexFRon AG | 2120-12-02 | 59.0 | 21.0 | 10.5 | 2.1 | 1:9 | 0 | 2 | 12.5 | Five laundry |
| (50% + 50%) | 2120-12-03 | 56.2 | 20.0 | 10.0 | 2.0 | 1:9 | 0 | 3 | 7 | Before laundry |
| padding | 2120-12-03 | 56.2 | 20.0 | 10.0 | 2.0 | 1:9 | 0 | 3 | 7 | Five laundry |
| 50%/50% | 2120-12-07 | 64.9 | 23.0 | 11.5 | 2.3 | 1:9 | 0 | 2 | 9 | Before laundry |
| Cotton/ | 2120-12-07 | 64.9 | 23.0 | 11.5 | 2.3 | 1:9 | 0 | 2 | 11.5 | Five laundry |

TABLE 36-continued

| | Sample # | % Add-on | % FR | % Br | % ATO | Br:Sb Molar ratio | flammability test | | | remarks |
| | | | | | | | After flame sec | After Glow sec | Char Length cm | |
|---|---|---|---|---|---|---|---|---|---|---|
| polyester Knit Br:Sb Molar ratio 9:1 | 2120-12-01 | 68.9 | 24.5 | 12.2 | 2.5 | 1:9 | 0 | 2 | 11 | Before laundry |
| | 2120-12-01 | 68.9 | 24.5 | 12.2 | 2.5 | 1:9 | 0 | 5 | 15 | Five laundry |

Although the invention has been described in conjunction with specific embodiments thereof, it is evident that many alternatives, modifications and variations will be apparent to those skilled in the art.

Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A textile flame retarded by a flame retardant composition, comprising:
   a. a brominated flame retardant, wherein said brominated flame retardant is selected from the group consisting of an aromatic brominated polymer, 2,2'[(1-methylethylidene) -bis-[(2,6-dibromo-4,1-phenylene)-oxymethylene]]-bisoxirane polymer with 2,2',6,6'-tetrabromo-4,4'-isopropylidenediphenol and 2,4,6-tribromophenol (FR4002), tetrabromobisphenol A diglycidyl ether copolymer (FR4001), tetrabromobisphenol A bis-(2,3-dibromopropyl ether) (FR9001), decabromodiphenyl ethane (FR1410), and ethylene-bis-tetra-ibromophthalimide (BT-93),
   b. an organic phosphorus-containing flame retardant, said organic phosphorus-containing flame retardant being an organic phosphate that is either an amorphous solid or a liquid at room temperature,
   c. a flame retardant which is a source of nitrogen and inorganic phosphorus, said source being an amorphous inorganic phosphate salt, wherein said inorganic phosphate salt is Aluminum Ammonium superphosphate;
   wherein the textile is antimony-free and has bromine content in the range from 4% to 22% of the total weight of the textile, passing ASTM D6413 flammability test.

2. The antimony-free textile of claim 1, wherein said organic phosphate is selected from the group comprising of Resorcinol-bis(diphenylphosphate), Tris (2-chloroisopropyl) phosphate, 2-Ethylhexyl Diphenyl Phosphate, and Butylated triphenyl phosphate ester.

3. The antimony-free textile of claim 1 wherein said brominated flame retardant ranges from 35% to 90% of the total weight of said flame retardant composition.

4. The antimony-free textile of claim 1 wherein said organic phosphate ranges from 15% to 50% of the total weight of said flame retardant composition.

5. The antimony-free textile of claim 1 wherein said source of nitrogen and inorganic phosphorus ranges from 10% to 30% of the total weight of said flame retardant composition.

6. A durable antimony-free, flame retarded textile according to claim 1.

7. The antimony-free textile of claim 6, wherein said textile is a fabric selected from nylon, cotton, polyester, and combinations thereof.

8. A method of making the antimony-free textile of claim 1, the method comprising applying the flame retardant formulation onto a flammable textile fabric including:
   a. contacting the flammable textile fabric with the flame retardant formulation; and
   b. heating said flammable textile fabric to obtain the antimony-free textile.

9. The process of claim 8, wherein said heating is conducted at between 140° C. and 180° C.

10. The process of claim 8, wherein said contacting is effected by exhaustion, spreading, coating, padding, dipping, printing, foaming and/or spraying.

11. The antimony-free textile of claim 1, wherein the bromine atoms in the brominated flame retardant are exclusively aromatically-bound, the organic phosphate is Resorcinol-bis(diphenylphosphate), and the bromine content in the range from 4% to 15% of the total weight of the textile.

12. The antimony-free textile of claim 11, wherein the textile is cotton polyester fabric, and the bromine content of the textile is from about 10 to about 15% of the total weight of the textile.

13. The antimony-free textile of claim 11, wherein the textile is cotton nylon fabric, and the bromine content of the textile is about 10% of the total weight of the textile.

* * * * *